(12) United States Patent
Corke et al.

(10) Patent No.: US 10,527,074 B2
(45) Date of Patent: Jan. 7, 2020

(54) METHOD AND APPARATUS OF PLASMA FLOW CONTROL FOR DRAG REDUCTION

(71) Applicant: University of Notre Dame du Lac, Notre Dame, IN (US)

(72) Inventors: Thomas C. Corke, Granger, IN (US); Flint O. Thomas, Granger, IN (US)

(73) Assignee: University of Notre Dame du Lac, South Bend, IN (US)

( * ) Notice: Subject to any disclaimer, the term of this patent is extended or adjusted under 35 U.S.C. 154(b) by 0 days.

(21) Appl. No.: 15/662,040

(22) Filed: Jul. 27, 2017

(65) Prior Publication Data

US 2018/0031013 A1 Feb. 1, 2018

Related U.S. Application Data

(60) Provisional application No. 62/367,279, filed on Jul. 27, 2016.

(51) Int. Cl.
| | |
|---|---|
| *F16C 1/04* | (2006.01) |
| *F15D 1/12* | (2006.01) |
| *B64C 23/00* | (2006.01) |
| *F01D 17/00* | (2006.01) |
| *H05H 1/24* | (2006.01) |
| *F15D 1/00* | (2006.01) |

(52) U.S. Cl.
CPC .............. *F15D 1/12* (2013.01); *B64C 23/005* (2013.01); *F01D 17/00* (2013.01); *F15D 1/0075* (2013.01); *H05H 1/2406* (2013.01); *B64C 2230/12* (2013.01); *F05D 2270/172* (2013.01); *H05H 2001/2412* (2013.01); *H05H 2001/2437* (2013.01)

(58) Field of Classification Search
CPC ..... F15D 1/12; B64C 23/005; B64C 2230/12; F01D 17/00; H05H 1/2406; H05H 1/2412; H05H 2001/2412; H05H 2001/2437
USPC ........... 137/825, 827; 244/205, 199.1, 200.1, 244/201, 203, 204
See application file for complete search history.

(56) References Cited

U.S. PATENT DOCUMENTS

| 4,863,121 | A | 9/1989 | Savill | |
|---|---|---|---|---|
| 7,017,863 | B2 * | 3/2006 | Scott | B64C 23/005 244/205 |
| 7,624,941 | B1 * | 12/2009 | Patel | B62D 35/007 244/3.22 |

(Continued)

OTHER PUBLICATIONS

International Search Report and Written Opinion for International Application No. PCT/US2017/044225, dated Nov. 3, 2017, 10 pages.

*Primary Examiner* — Minh Q Le
(74) *Attorney, Agent, or Firm* — Greenberg Traurig, LLP

(57) ABSTRACT

A plasma plate is used to minimize drag of a fluid flow over an exposed surface. The plasma plate includes a series of plasma actuators positioned on the surface. Each plasma actuator is made of a dielectric separating a first electrode exposed to a fluid flow and a second electrode separated from the fluid flow under the dielectric. A pulsed direct current power supply provides a first voltage to the first electrode and a second voltage to the second electrode. The series of plasma actuators is operably connected to a bus which distribute powers and is positioned to minimize flow disturbances. The plasma actuators are arranged into a series of linear rows such that a velocity component is imparted to the fluid flow.

15 Claims, 28 Drawing Sheets

(56) References Cited

U.S. PATENT DOCUMENTS

| | | | |
|---|---|---|---|
| 8,016,246 B2* | 9/2011 | Schwimley | B64C 21/00 244/1 N |
| 8,220,753 B2 | 7/2012 | Silkey et al. | |
| 8,308,112 B2 | 11/2012 | Wood et al. | |
| 8,523,115 B2 | 9/2013 | Essenhigh et al. | |
| 2007/0089795 A1* | 4/2007 | Jacob | B64C 23/005 137/827 |
| 2010/0004799 A1* | 1/2010 | Drouin, Jr. | B64C 23/005 701/3 |
| 2010/0047055 A1 | 2/2010 | Wadia et al. | |
| 2010/0047060 A1* | 2/2010 | Wadia | F04D 29/526 415/173.1 |
| 2010/0127624 A1* | 5/2010 | Roy | B64C 23/005 315/111.21 |
| 2010/0133386 A1* | 6/2010 | Schwimley | B64C 23/005 244/205 |
| 2011/0180149 A1* | 7/2011 | Fine | B01J 21/063 137/1 |
| 2012/0312923 A1* | 12/2012 | Chang | B64C 23/005 244/130 |
| 2013/0038199 A1* | 2/2013 | Roy | H05H 1/24 313/231.31 |
| 2013/0064710 A1* | 3/2013 | Jacob | A61L 9/22 422/4 |
| 2013/0277502 A1 | 10/2013 | Bauer et al. | |
| 2014/0076712 A1* | 3/2014 | Jacob | A61L 2/14 204/158.2 |
| 2014/0144584 A1 | 5/2014 | Koo et al. | |
| 2014/0284325 A1* | 9/2014 | Roy | H05H 1/2406 219/770 |
| 2014/0321987 A1* | 10/2014 | Nolcheff | F01D 17/00 415/148 |
| 2015/0076987 A1* | 3/2015 | Sauti | H05H 1/2406 313/359.1 |
| 2015/0267727 A1* | 9/2015 | Segawa | F04D 29/681 313/231.31 |
| 2017/0181260 A1 | 6/2017 | Corke et al. | |
| 2018/0303538 A1* | 10/2018 | Browning | A61B 18/042 |

* cited by examiner

Table 1–Boundary layer parameters
| M | $U_\infty$ (m/s) | x (m) | $Re_x$ | $u_\tau$ (m/s) | $\delta^*$ (mm) | $y^+=100$ (mm) | $z+@\Lambda z=25$mm |
|---|---|---|---|---|---|---|---|
| 0.1 | 35 | 2.2 | 4.91M | 1.13 | 0.012 | 1.2 | 2117 |
FIG. 10
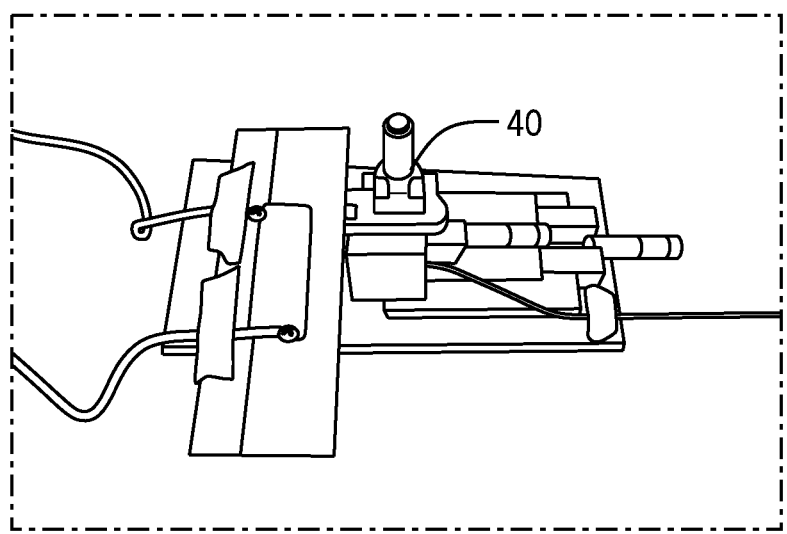
FIG. 11A
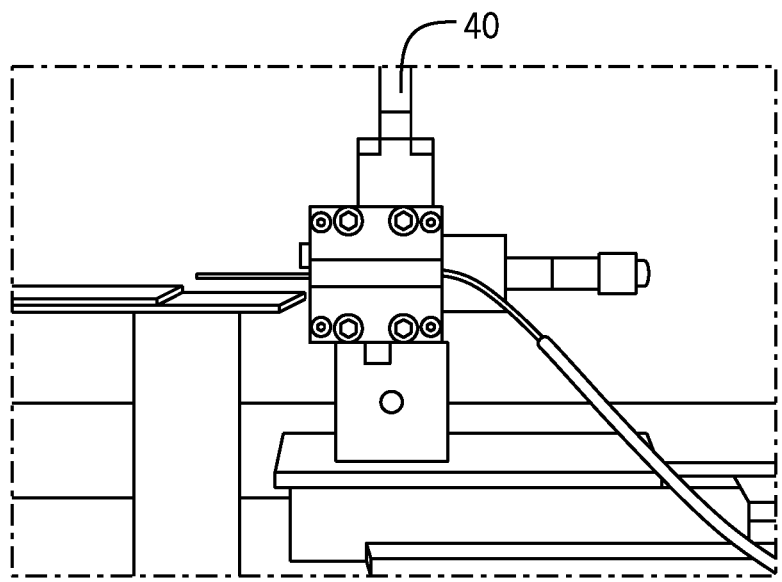
FIG. 11B

TABLE 2-PLASMA PLATE CONFIGURATIONS

| Case | COVERED ELECTRODE (mm) | EXPOSED ELECTRODE |
|---|---|---|
| 1 | 16 | EDGE |
| 2 | 16 | MIDDLE |
| 3 | 24 | EDGE |
| 4 | 24 | MIDDLE |

TABLE 3—PLASMA PLATE CONFIGURATION PULSE WIDTH DUTY CYCLE

| 16 mm - EDGE | | 16 mm - CENTERED | | 24 mm - EDGE | | 24 mm - CENTERED | |
|---|---|---|---|---|---|---|---|
| PULSE($10^{-7}$s) | DUTY (%) | PULSE($10^{-7}$s) | DUTY (%) | PULSE($10^{-7}$s) | DUTY (%) | PULSE($10^{-7}$s) | DUTY (%) |
| 0.6590 | 0.0034 | 0.6027 | 0.0031 | 0.6066 | 0.0031 | 1.2420 | 0.00064 |
| 0.5673 | 0.0029 | 0.6380 | 0.0033 | 0.6116 | 0.0031 | 1.3100 | 0.0067 |
| 0.5734 | 0.0029 | 0.6896 | 0.0035 | 0.2610 | 0.0013 | 1.0910 | 0.0056 |
| 0.2245 | 0.0012 | 0.6911 | 0.0035 | 0.2249 | 0.0012 | 1.0750 | 0.0055 |
| 0.2264 | 0.0012 | 0.6778 | 0.0035 | 0.1633 | 0.0008 | 1.0070 | 0.0052 |

FIG. 17B

TABLE 4—PLASMA PLATE CONFIGURATION POWER INPUT

| $V_{DC}$ | 16 mm - EDGE | | 16 mm - CENTERED | | 24 mm - EDGE | | 24 mm - CENTERED | |
|---|---|---|---|---|---|---|---|---|
| | WATTS | W /m | WATTS | W /m | WATTS | W /m | WATTS | W /m |
| 4 | 0.3902 | 0.193 | 0.5007 | 0.157 | 0.3646 | 0.293 | 0.7902 | 0.318 |
| 5 | 0.6143 | 0.384 | 0.8318 | 0.260 | 0.6081 | 0.489 | 1.3169 | 0.529 |
| 6 | 0.9275 | 0.580 | 1.2434 | 0.389 | 0.4152 | 0.334 | 1.7063 | 0.686 |
| 7 | 0.5279 | 0.330 | 1.6463 | 0.514 | 0.4592 | 0.369 | 2.2941 | 0.922 |
| 8 | 0.6564 | 0.407 | 2.0968 | 0.655 | 0.4446 | 0.357 | 2.6698 | 1.045 |

FIG. 17C

TABLE 5—PROJECTED PLASMA PLATE CONFIGURATION AND NET POWER BENEFIT AS MACH NUMBER INCREASES

| MACH NO. | $z+=$ 1000 | $\Delta z_{ELTRDS}$ | ELTRD. NO. | PLASMA LEN. | PLASMA POWER | DRAG POWER | 60% DRAG | 0.6 DRAG P / PLASMA P |
|---|---|---|---|---|---|---|---|---|
| - | (mm) | (mm) | (228.6 mm SPAN) | (mm) | (W) | (W) | (W) | - |
| 0.1 | 11.00 | 22.00 | 9.00 | 3200 | 1.59 | 3.99 | 2.39 | 1.51 |
| 0.2 | 5.81 | 11.63 | 17.00 | 6045 | 3.00 | 28.44 | 17.06 | 5.68 |
| 0.3 | 4.00 | 8.01 | 25.00 | 8890 | 4.42 | 89.67 | 53.80 | 12.18 |
| 0.4 | 3.07 | 6.15 | 32.00 | 11379 | 5.65 | 202.10 | 121.26 | 21.45 |
| 0.5 | 2.50 | 5.00 | 40.00 | 14224 | 7.07 | 378.40 | 227.04 | 32.13 |
| 0.6 | 2.12 | 4.23 | 47.00 | 16713 | 8.30 | 630.10 | 378.06 | 45.53 |

FIG. 17D

METHOD AND APPARATUS OF PLASMA FLOW CONTROL FOR DRAG REDUCTION

CROSS REFERENCE TO RELATED APPLICATION

This application is a non-provisional claiming priority to U.S. Patent Application No. 62/367,279 entitled "Novel Method Of Plasma Flow Control for Drag Reduction," filed previously on Jul. 27, 2016, the contents of which are incorporated herein by reference in their entirety.

GOVERNMENT LICENSE RIGHTS

This invention was made with government support under Grant Number #NNX15CL65P awarded by NASA. The government has certain rights in the invention.

FIELD OF THE DISCLOSURE

The present description relates generally to a pulsed direct current powering system for a dielectric barrier discharge (DBD) plasma actuator for flow control.

BACKGROUND OF RELATED ART

It is known that improving fuel efficiency is an ongoing goal for both government and industry, both within the United States and internationally. Fuel costs have historically been the largest single cost associated with aircraft operations; improved efficiency therefore translates directly to the bottom line. The worldwide aviation industry is a significant emitter of carbon dioxide and other greenhouse gases; the International Civil Aviation Organization (ICAO) puts it at 2% of the global anthropogenic total. The impact of these emissions is amplified even more, however, because they go directly into the upper troposphere. Both Government regulators and industry associations have set aggressive goals for reducing these emissions, but these will require significant new technology. An effective drag-reducing technique will directly assist in reducing fuel consumption, and hence reduce fuel expenses and greenhouse gas emissions.

It is well known that streamwise vorticity dominates near-wall turbulence production and skin friction drag. As such, efforts to intervene in the self-sustaining mechanism of streamwise vortex formation and instability will yield drag reduction. Prior research described a new mechanism for coherent structure generation in the self-sustaining mechanism of near-wall turbulence. Their results strongly suggest that normal mode low-speed streak instability is not a significant contributor to streamwise vortex growth and near-wall turbulence production. Rather, they proposed and demonstrated a new "Streak Transient Growth Instability" (STGI) as the dominant streamwise vortex generation mechanism. Their work showed that STGI can produce order-of-magnitude linear growth of streamwise disturbances.

Other works, based on direct numerical simulations of channel flow, have proposed a strategy for drag reduction by actively intervening in the STGI process. In particular, they found that streamwise coherent structures in near-wall turbulence are created by the sinuous instability of lifted vortex-free streaks due to the presence of previous vortices. They proposed a method of large-scale flow control for drag reduction, which exploits the fact that the low-speed streak growth rate depends critically on the wall-normal vorticity, $\omega_y$, flanking the streak as shown in FIG. 1. This figure presents the instability growth rate as a function of wall normal vorticity and clearly delineates regions of stability and instability based on the magnitude of $\omega_y$.

The authors demonstrate that control schemes based on decreasing $\omega_y$ are successful in achieving very significant drag reduction (e.g. up to 50% in their channel flow DNS). They found that control in the form of either spanwise colliding wall jets or an array of 2D counter-rotating vortices was able to break the cycle of near-wall vortex generation by disrupting the unstable streak distribution due to older, preexisting streamwise vortices. Their approach has the advantage of achieving distributed flow control without the need for any flow sensors or supporting control logic.

BRIEF DESCRIPTION OF THE DRAWINGS

FIG. 10 is a table of the boundary layer parameters.

FIG. 11A is a photograph of the setup used to measure the velocity field induced by the plasma actuator.

FIG. 11B is another photograph of the setup used to measure the velocity field induced by the plasma actuator shown in FIG. 11A.

FIG. 17B is a table of the configurations of the plasma plate showing the pulse duty width cycle.

FIG. 17C is a table of the configurations of the plasma plate showing the power input.

FIG. 17D is a table of the configurations of the plasma plate showing net power benefit as Mach number increases.

DETAILED DESCRIPTION

The following description of example methods and apparatus is not intended to limit the scope of the description to the precise form or forms detailed herein. Instead the following description is intended to be illustrative so that others may follow its teachings.

In this disclosure, it is achieved significant skin friction drag reduction in self-sustaining, fully turbulent, wall bounded flows by implementing large-scale, smart, active flow control at the wall, which serves to intervene in the STGI mechanism. The disclosed plasma array achieves this effect by imparting a velocity component to a fluid. The plasma array is (shown in FIGS. 14A-15B) uses a ordered series of plasma actuators (shown in FIG. 6) to control the vorticity of the fluid flow around the wall. This is termed revolutionary new flow control technology "Smart Longitudinal Instability Prevention via Plasma Surface" or SLIPPS which is discussed in more detail below.

In this disclosure, it is demonstrated, both experimentally and numerically, the viability of the SLIPPS flow control method to reduce drag. This demonstration is focused on a flat plate experimental configuration at low Mach number. The corresponding simulations are of a fully developed channel flow at a higher Mach number, but with the Reynolds number reduced in order to enable resolution of all the important unsteady scales of motion.

The objectives of the this disclosure are, therefore, to demonstrate that: 1) A plasma-based approach can intervene successfully in the STGI mechanism and create meaningful drag reduction. 2) Numerical simulations can resolve the same physics and predict the drag reducing effects of plasma intervention in the STGI mechanism.

Figure 2:
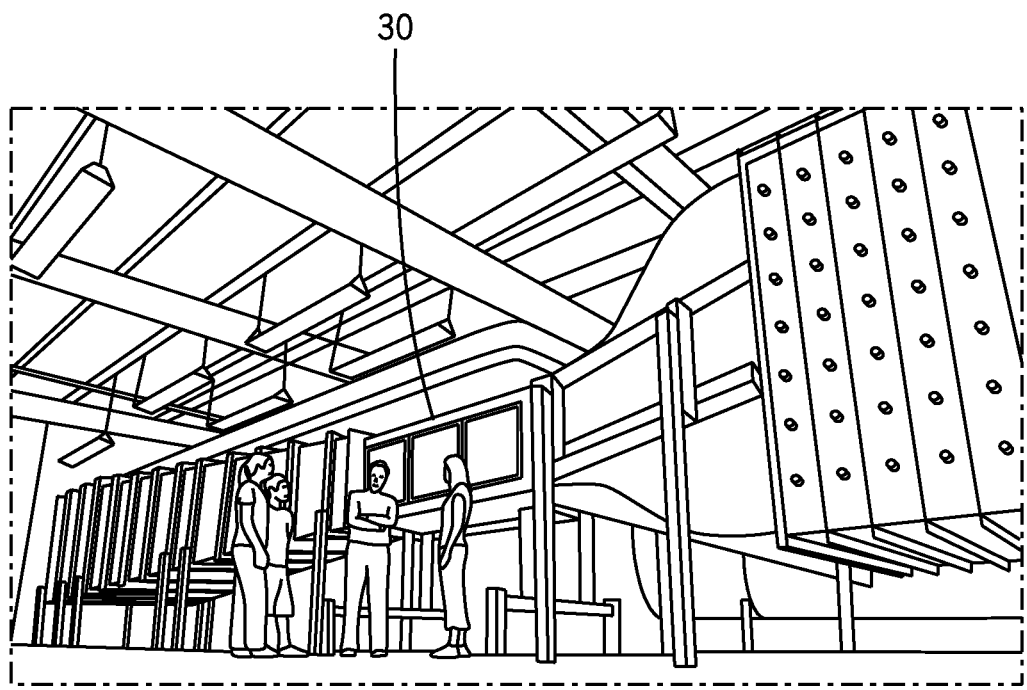
FIG. 2 is a photograph of the Notre Dame Mach 0.6 wind tunnel.
Figure 3A:
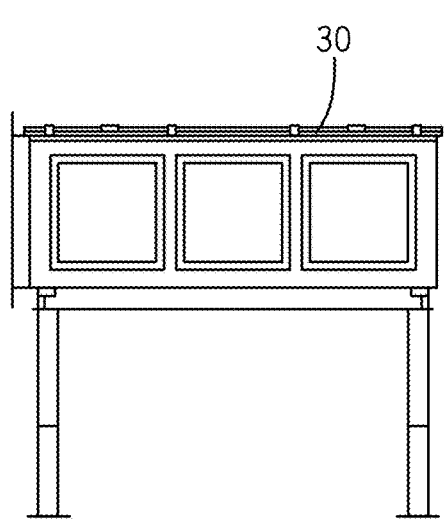
FIG. 3A is a schematic drawing of the wind tunnel shown in FIG. 2.
Figure 3B:
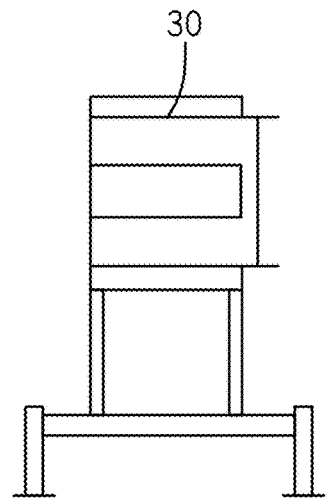
FIG. 3B is an end view of the schematic drawing of the wind tunnel of FIG. 3A.
Figure 3C:
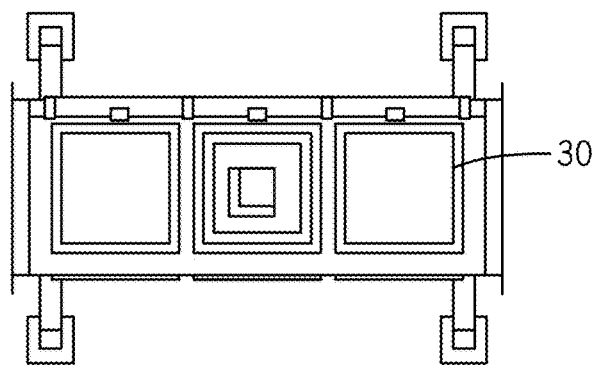
FIG. 3C is a top view of the schematic drawing of the wind tunnel of FIG. 3A.
Figure 3D:
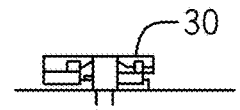
FIG. 3D is a detailed view of the schematic drawing of the wind tunnel of FIG. 3A.

The disclosure was validated in the Notre Dame Mach 0.6 wind tunnel 30. A photograph of the wind tunnel used to verify this disclosure is shown in FIG. 2. This is a low-disturbance closed return wind tunnel with free-stream air temperature control. The test section dimensions are 1 m by 1 m cross-section by 3 m long. The Mach number range in the test section is from 0.05 to 0.6. The air temperature range in the test section is 32° C. to 60° C. The test section is designed with three removable and fully interchangeable windows on all four sides. The windows can be replaced with panels that can be specifically designed for different experiments. A schematic of the test section shown in FIGS. 3A-3D illustrates how panels are used in window openings to act as hard points for the installation of various test articles. The test article in the schematic is a NASA Energy Efficient Transport ("EET") airfoil section. The airfoil in this schematic is mounted on a pair of force plates that ride on linear bearings. The same concept was used to measure drag on the test plate in the present experiment.

A 9 in. by 9 in. test plate was located in the center of a removable Aluminum panel that was placed in one of the window locations in the test section. This test plate was either a smooth hard surface, or one of the plasma actuator covered surfaces. The Aluminum panel was machined to a high tolerance so that the gap around the test plate was no more than 0.020 in.

The test plate was mounted on a pair of linear air bearings that were mounted under the Aluminum panel. The connection to the test plate was adjustable at four points so that the flow-side surface of the test plate could be made to be flush to within ±0.01 O in. of the inside surface of the surrounding Aluminum panel.

Figure 4:
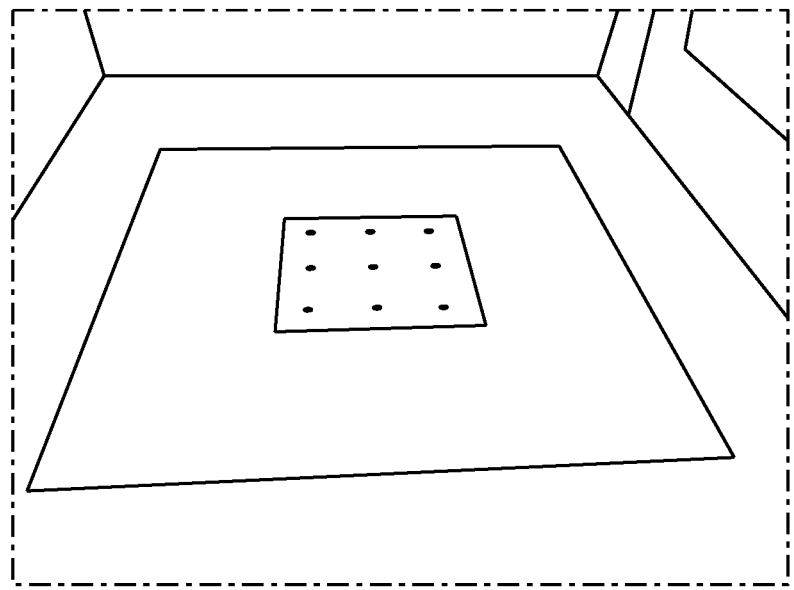
FIG. 4 is a photograph of the removable aluminum panel with a test hard-wall liner coupon located in the center.
Figure 5:
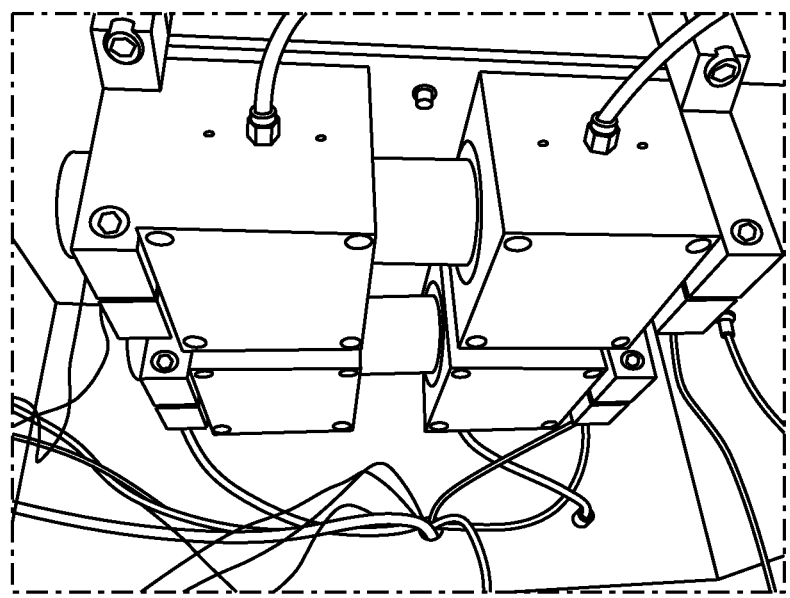
FIG. 5 is a photograph of a pair of linear air bearings used in the wind tunnel test section.

A photograph of the smooth test plate located in the center of the Aluminum panel is shown in FIG. 4. A photograph of the linear air bearing system that supports the test plate is shown in FIG. 5. In the present experiments, the Aluminum panel in which the plasma test plate was held was located in the most downstream position in the test section floor. This provided the thickest naturally developing turbulent boundary layer, and x-Reynolds number, at the plasma test plate location.

In addition to the naturally developing turbulent boundary layer, a boundary layer trip consisting of a 0.25 in. thick bar that spanned the test section, was used to produce a thicker turbulent boundary layer at the panel location. The mean velocity profiles of the two boundary layer cases just upstream of the plasma panel were documented with a Pitot static probe mounted to a traversing mechanism.

The air bearings supporting the plasma test plate were aligned in the mean flow direction. They provide a frictionless motion that was resisted by a translation load cell. The load cell thus measure the aerodynamic force (drag) that was exerted on the test plate. For the velocity range used in the experiments, a load cell with a maximum rating of 0.5 N (50 gm.) was selected. The load cell is an SMD S100, which according to the manufacturer has a hysteresis of 0.05% of rated output ($R_0$=50 gm.) and a non-repeatability of 0.05% of $R_0$. Summing these errors, the total possible error is 0.08% of RO or approximately 0.04 gm. For the range of Mach numbers expected to be from approximately 3.05 gm. to 12.2 gm. Therefore, the maximum uncertainty in the drag measurements was approximately 1% of 0.05 to 0.1 utilized in the experiments, the drag force on the 9 in. by 9 in. test panel was expected to be from approximately 3.05 gm to 12.2 gm. Therefore, the maximum uncertainty in the drag measurements was approximately 1%.

The Mach number in the test section was monitored using a Pitot-static probe and a temperature sensor located at the entrance to the test section. Their readings were fed back to the wind tunnel control system to maintain a constant condition. The voltages proportional to the temperature, pressures and drag force were acquired through a digital-to-analog converter in a digital data acquisition computer that operated in a Matlab environment. These voltages were converted back to physical quantities using pre-determined calibration relations.

In this disclosure, it is demonstrated over 65% drag reduction using the innovative SLIPPS concept. A new powering system for dielectric barrier discharge (DBD) plasma actuators that utilizes a pulsed-DC waveform was used to operate the plasma panels. Per experimental evidence of the breakthrough performance in drag reduction achieved in Phase I, it is believed that this revolutionary new actuator offers tremendous potential as a practical drag reduction device for air vehicles.

Figure 6:
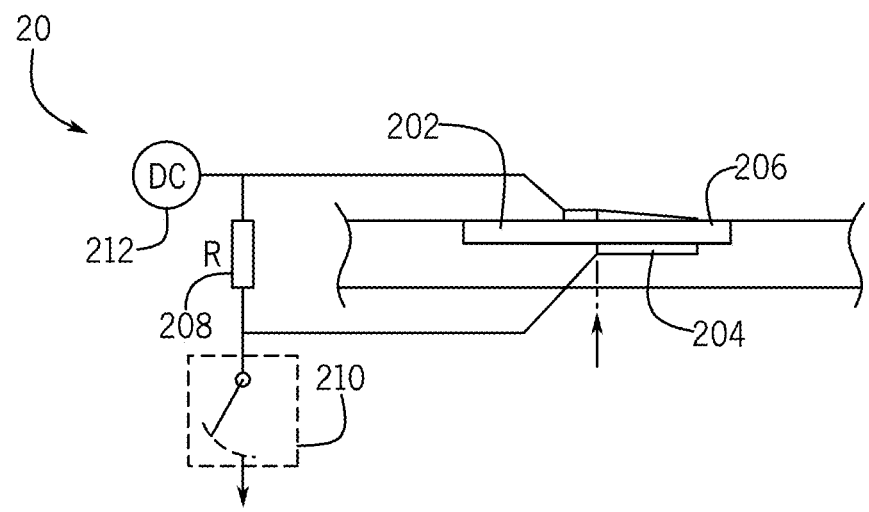
FIG. 6 is a schematic illustration of a DB DBD plasma actuator.

Referring now to the figures, FIG. 6 shows an example prior art AC-DBD plasma actuator 10 including a pair of electrodes 102 and 104, a dielectric 106, and a power source 112. The electrodes 102 and 104 are separated by dielectric 106 but both electrically connected to the power source 112 which is capable of producing an AC waveform. The electrodes 102 and 104 are supplied with an AC voltage from the power source 112 that causes the air over the covered electrode to ionize. The ionized air, in the presence of the electric field produced by the geometry of electrodes 102 and 104, results in a body force vector field that acts on the ambient (non-ionized, neutrally charged) air or other fluid. The body force can be used as a mechanism for active aerodynamic control.

As shown in the schematic for the pulsed-DC plasma actuator 20 in FIG. 6, the DC voltage source 212 is electrically connected to both the exposed electrode 202 and the lower electrode 204. Between the electrodes, the resistor 208 limits the current to the lower electrode 204, which is also connected to a fast-acting solid-state switch 210. The solid-state switch 210, when closed, shorts the voltage to the lower electrode to the power supply ground from the DC voltage originally supplied. A periodic trigger signal consisting of a transistor-transistor logic (TTL) pulse is supplied to activate the solid-state switch 210 to deliver the micro-pulses to the electrodes 202, 204. This can be accomplished by an external controller or an internal signal generator. The pulse formed by the DC waveform produced by voltage source 212 and solid state switch 212 is a square wave with a floor of 0 V and a ceiling of the output voltage of voltage source 212. In other examples, the pulse could be varied with frequency modulation to include different pulses lengths, and the DC waveform could also be constructed to regulate and control the voltage at either electrode 202, 204.

A Pulsed-DC plasma actuator configuration is used similarly to the most typical AC-DBD designs. However, instead of an AC voltage input to drive the actuator, the pulsed-DC utilizes a DC voltage source. The DC source is supplied to both electrodes, and remains constant in time for the exposed electrode. The DC source for the covered electrode is periodically grounded for very short instants on the order of $10^{-5}$ seconds. This process results in a plasma actuator body force that is three-times larger than that with an AC-DBD at the same voltages. More importantly, this new approach offers more controls on the body force that can potentially help to limit the effect to the sublayer region of the turbulent boundary layer.

The predominant DBD configuration used for flow control consist of two electrodes, one uncoated and exposed to the air and the other encapsulated by a dielectric material. For plasma actuator applications, the electrodes are generally arranged in a highly asymmetric geometry. An example configuration is shown in the left part of FIG. 6. For the AC-DBD operation, the electrodes are supplied with an AC voltage that at high enough levels, causes the air over the covered electrode to weakly ionize. The ionized air, in the presence of the electric field produced by the electrode geometry, results in a body force vector field that acts on the ambient (non-ionized, neutrally charged) air. The body force is the mechanism for active aerodynamic control. In determining the response of the ambient air, the body force appears as a term on the right-hand-side of the fluid momentum equation.

For a single dielectric barrier discharge, during one-half of the AC cycle, electrons leave the metal electrode and move towards the dielectric where they accumulate locally. In the reverse half of the cycle, electrons are supplied by surface discharges on the dielectric and move toward the metal electrode. Prior research studied the space-time evolution of the ionized air light-emission over a surface mounted SDBD plasma actuator. During the negative-going half cycle, the electrons originate from the bare electrode, which is essentially an infinite source that readily gives them up. In the positive-going half cycle, the electrons originate from the dielectric surface. These apparently do not come off as readily, or when they do, they come in the form of fewer, larger micro-discharges. This asymmetry plays an important role in the efficiency of the momentum coupling to the neutrals. The result is that the intra-AC-cycle body force occurs in two short durations, with that associated with the electrons leaving the exposed electrode being much larger than that when they leave the dielectric surface. This is often referred to as a "big push" and "little push". AC waveforms such as a saw-tooth can maximize the big-push portion.

As shown in the schematic for the pulsed-DC plasma actuator in right part of FIG. 6, the DC source 212 is supplied to both electrodes 202, 204. A resistor, R, limits the current to the lower electrode, which is also connected to a fast-acting solid-state switch that when closed, shorts the voltage to the lower electrode to the power supply ground. A periodic trigger signal consisting of a TTL pulse is supplied to activate the solid-state switch 210.

Figure 7:
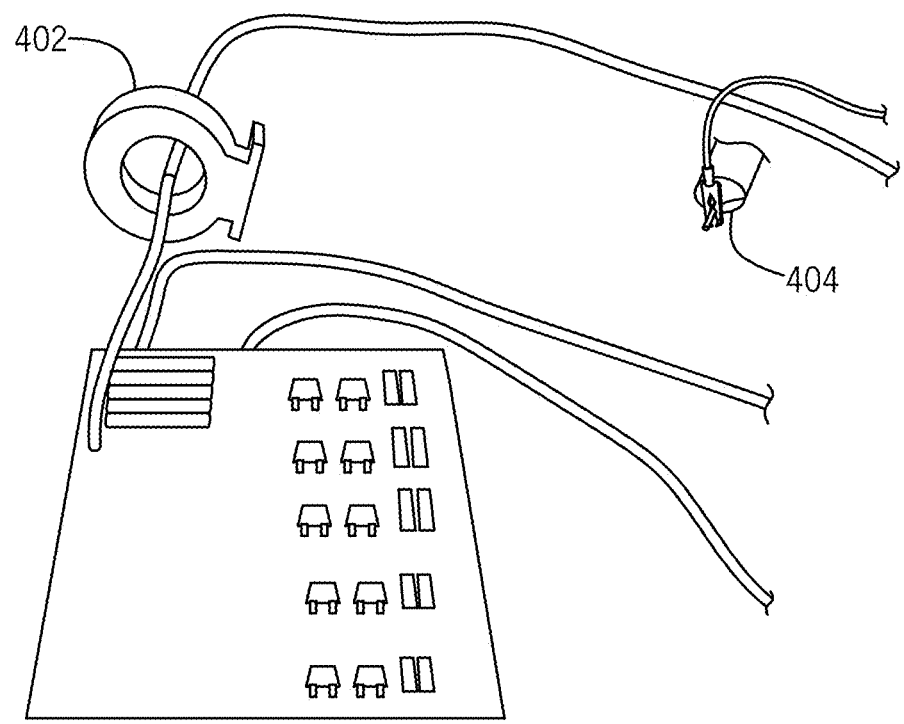
FIG. 7 is a photograph of the an example of a plasma actuator circuit according to teachings of this disclosure.

A picture of an example assembled circuit is shown in FIG. 7 which shows an inductive current sensor 402 and a high voltage probe 404 as part of a test setup for the actuator. Also visible in the photograph are the inductive current sensor 402 (Pearson Model 2100) seen as the thick ring in the background, and the high voltage probe 404 (LeCroy Model PPE 20 kV) seen in the upper right corner. These were used to record current and voltage time series supplied to the actuator. Analysis of these time series was used to correlate its effect on the thrust performance of the actuator. The high-voltage DC power supply 212 used for these experiments is a Glassman, Model PS/PH050R60-X18 with a maximum voltage rating of 50 kV, and maximum current limit of 60 mA. The thrust generated by the plasma actuator 20 was measured by mounting the actuator on an electronic force measuring scale.

Figure 8A:
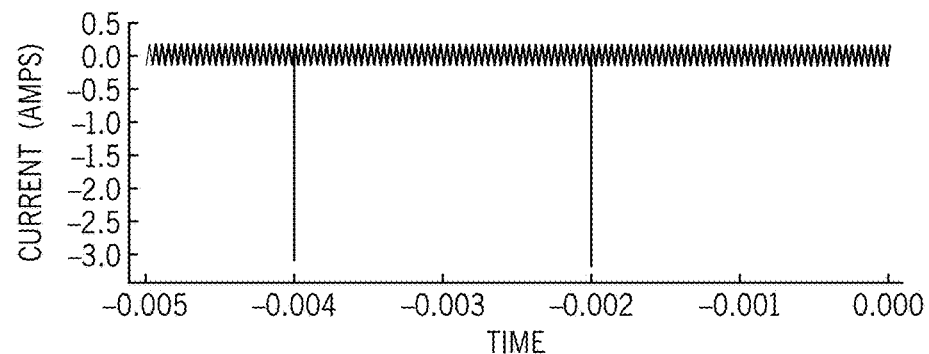
FIG. 8A is a chart showing the voltage time series measuring at the covered electrode.
Figure 8B:
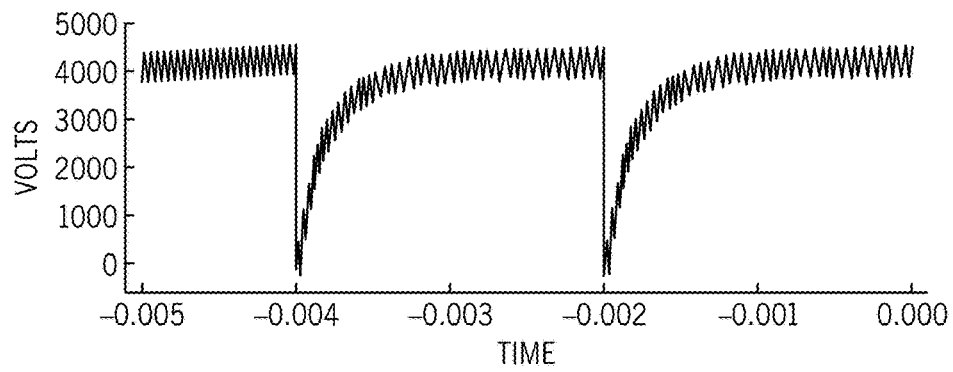
FIG. 8B is a chart showing the voltage time series measuring at the exposed electrode.

An example of the simultaneously captured voltage and current time series for one of the plasma test plates is shown in FIGS. 8A-8B. This corresponds to a supply voltage, VddH=4 kV and a pulsing frequency of 512 Hz. The lower plot shows the voltage time series measured at the covered electrode. This represents the output of the high-speed solid-state switch 212. FIG. 8A corresponds to the corresponding current time series that was measured at the exposed electrode. FIG. 8B corresponds to the corresponding voltage time series that was measured at the exposed electrode.

Figure 9:
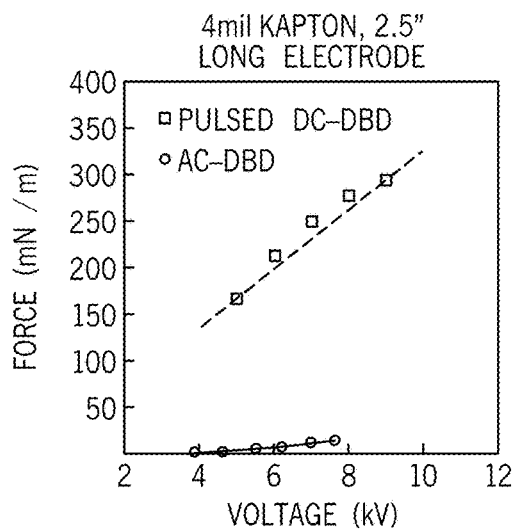
FIG. 9 is a chart of induced thrust from the AC and DC DBD plasma actuator

Experiments have been performed to document the induced thrust produced by the example DBD plasma actuator. For this, the plasma actuator consisted of electrodes that were 2.5 in. in length. The dielectric layer consisted of two, 2 mil. thick layers of Kapton film. The actuator was operated either with an AC input or with a pulsed-DC input. The two approaches were categorized in terms of the amount of induced thrust produced by the two plasma actuator arrangements. The improved results are shown in the chart of FIG. 9.

There are two notable features with the AC plasma actuator operation. The first is that the thrust increase with input voltage displays the characteristic power law relation namely, $T \sim V^{3.5}$. The second feature is that the generated thrust is significantly less than that of the pulsed-DC operation. The advantage of the pulsed-DC plasma actuator for the present research is its ability to decouple the air ionization generation, produced by the short duration short of the covered electrode, with that of the voltage control, which is set by the DC level applied to the two electrodes. In contrast, the AC-DBD approach has only one control: voltage. As a result, the pulsed-DC approach has the potential to localize the spanwise blowing effect and affect to the near-wall region of the turbulent boundary layer. Furthermore, the lower required power of the pulsed-DC approach is favorable in terms of achieving a net drag reduction that includes the power to the actuator.

Extensive discussions have been held between team members and interested parties at NASA. One of the most discussed issues has been the physics behind the pulsed-DC actuator's low power usage relative to the earlier AC-DBD designs. The optimized Pulsed-DC DBD power configuration is manifest as a short duration current pulse in a longer transient, decaying electric field. The short current pulse acts to both ionize and transfer an initial increment of momentum to the air. Following the pulse, when the measured external current is zero, remaining ions continue to be accelerated by the decaying DC electric field. The energy responsible for this additional momentum transfer is fully accounted for by the initial current pulse. After a delay time determined by the RC time constant consisting of the actuator capacitance C and isolation resistor R, the cycle is repeated. After sufficient pulses, an equilibrium induced-flow amplitude is reached, based on air properties, voltage amplitude and decay rate, and pulse width and frequency. Compared to the conventional AC-DBD, the Pulsed-DC DBD creates only the minimum ions required to accelerate the air, resulting in much higher electrical-to-kinetic energy conversion efficiency. Compared to the nano-pulse DBD that creates solely a scalar pressure and temperature perturbation, the pulsed-DC DBD retains directional momentum transfer readily adaptable to flow control applications. This is consistent with all of the experimental observations."

The design of the plasma plates 42 (shown below in FIGS. 14A-B) was based on a mechanism for turbulent boundary layer drag reduction the involved introducing a spanwise velocity component near the wall. The velocity component could be uniform in one direction or opposing directions, however for drag reduction it needed to be confined to the boundary sublayer and buffer layer, $y^+ \leq S100$.

The parameters for the design were based on a combination of experiments that were performed on test samples. These tests needed to confirm the width of exposed electrodes and spacing between covered electrodes that were needed to prevent plasma from forming in unintended regions. The width of the covered electrode was also a parameter since it provided a length over which the actuator induced velocity developed. The width and spacing of electrodes, which were largely based on the plasma actuator physics, also impacted the design for drag reduction, since when put in terms of boundary layer spanwise wall units, z+, needed to be in the range, of the order of 400-500, that was thought to be optimal in the literature. Table 1 shown in FIG.

10 provides some reference lengths based on the expected boundary layer conditions at the location of the plasma plate for M=0.1. Of particular interest is the z+ extent corresponding to a physical spacing of the design of the plasma plates was based on a mechanism for turbulent boundary layer drag reduction the involved introducing a spanwise velocity component near the wall. The velocity component could be uniform in one direction or opposing directions, however for drag reduction it needed to be confined to the boundary sublayer and buffer layer, y+:S100.

This design of the plasma plates involved using a 3 mil. thick Ultem film as the dielectric layer. Ultem has a dielectric strength of 5 kV/mil., which is comparable to Kapton. However, in contrast with Kapton, Ultem is not affected by the ozone generated by the plasma that limits the operating life of Kapton film. Various plasma actuators were fabricated using the Ultem to examine the minimum width of exposed electrodes and spacing between covered electrodes to prevent plasma from forming on the edge of the exposed electrode that was not facing the covered electrode. The minimum width of the exposed electrode was found to be 1.6 mm. The minimum spacing between the covered electrodes was found to be 4.8 mm.

The last task needed in the design of the plasma plate was to determine the width of the covered electrode. This involved performing velocity measurements over the covered electrode. The object was to determine how the maximum induced velocity from the plasma actuator developed with distance from the exposed electrode. A photograph of the experimental setup is shown in FIG. 11A. It consisted of a glass total pressure probe 40. The glass probe was fabricated from a hollow glass tube with a 0.0625 mm O.D. that was heated at one end and stretched to form a sharp point. The point was broken off to leave a small opening. The tapered tip of the glass probe is best viewed in the side-view photograph in FIG. 11B. The glass probe was mounted to a two-axis micrometer traversing mechanism that was manually operated. The glass total pressure probe was connected to one side of a Validyne differential pressure transducer with a diaphragm that provided a full-scale pressure range of 12.7 mm of water. The other side of the differential pressure transducer was open to the atmosphere in the lab. The voltages proportional to pressure were acquired with a digital computer and converted to velocity.

Figure 12A:
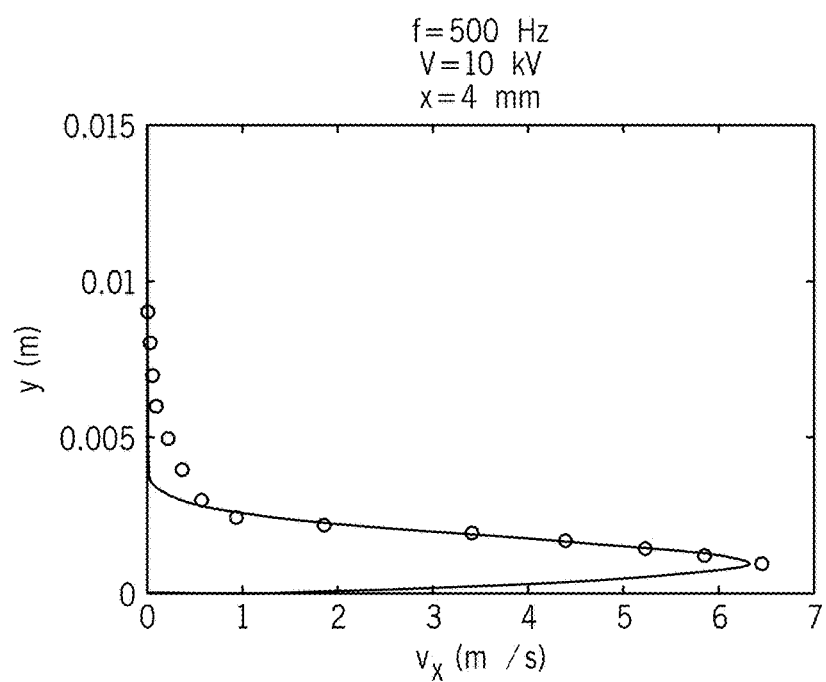
FIG. 12A is a graphical depiction of the mean induced velocity of the plasma actuator 4 mm from the exposed electrode.
Figure 12B:
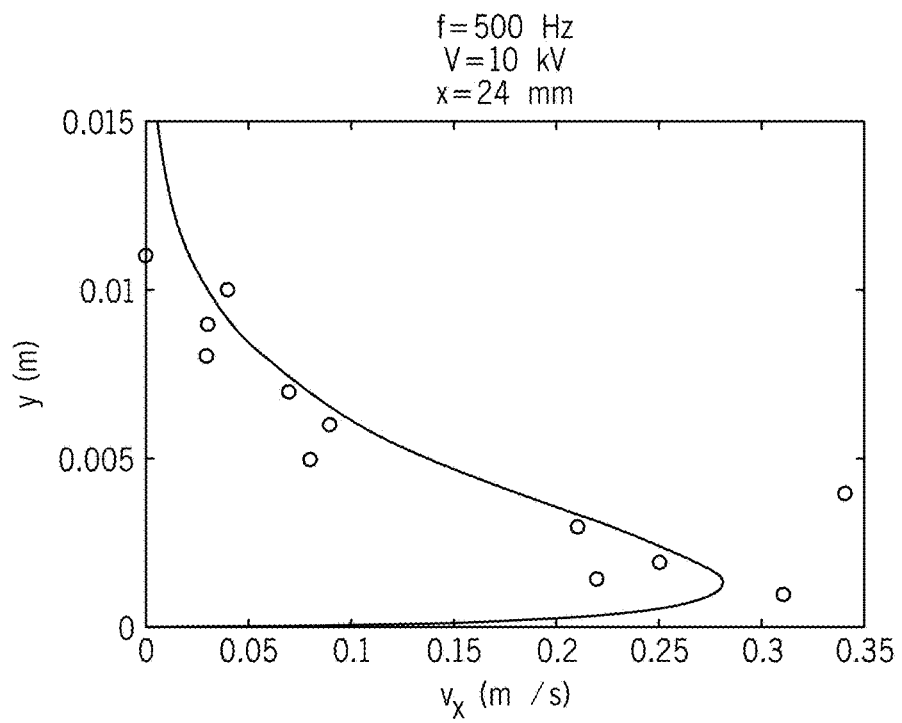
FIG. 12B is a graphical depiction of the mean induced velocity of the plasma actuator 24 mm from the exposed electrode.
Figure 13A:
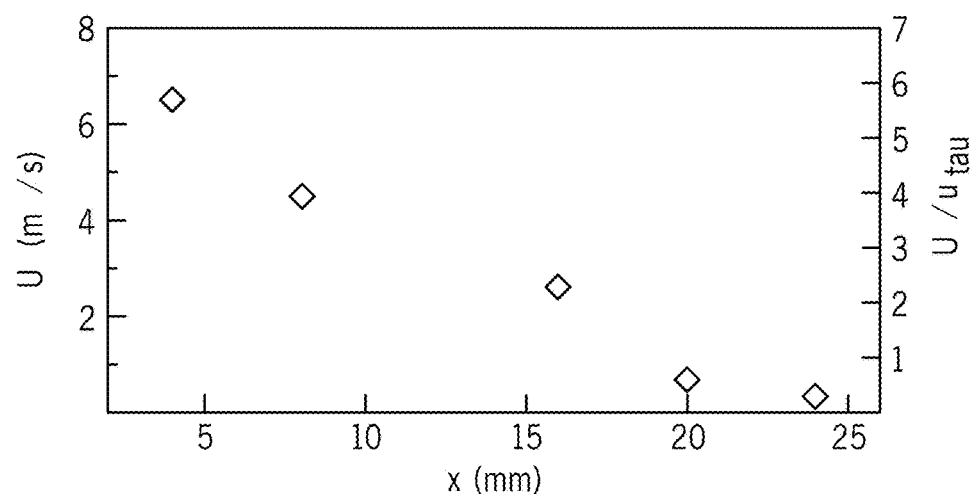
FIG. 13A is a graph of the peak induced velocity as a function of distance from the exposed electrode.
Figure 13B:
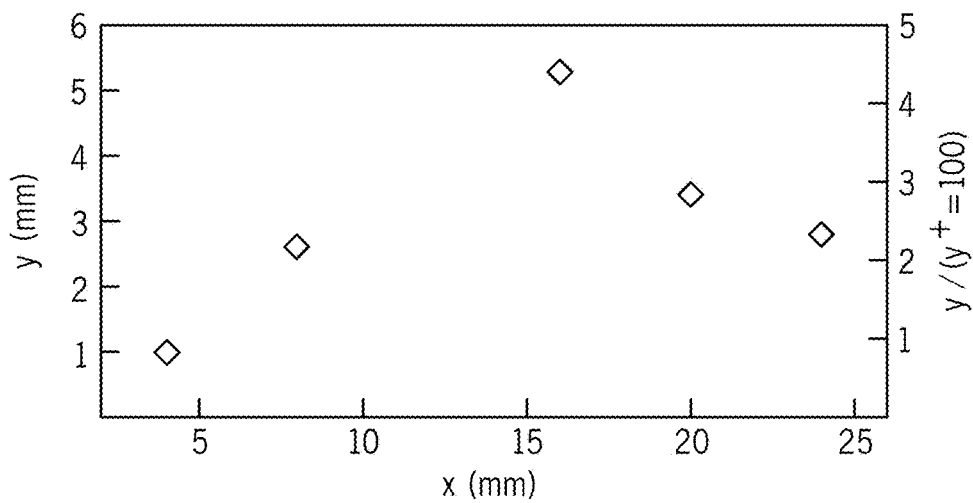
FIG. 13B is a graph of the distance of the peak induced velocity as a function of distance from the exposed electrode.

Examples of the velocity profiles in physical velocity units, measured at the closest (4 mm) and furthest (24 mm) distances from the edge of the exposed electrode are shown in FIG. 11. This was for the pulsed-DC plasma actuator operating with a DC voltage of 10 kV and a pulsing frequency of 500 Hz. Velocity profiles like those shown in FIGS. 12A-12B were used to document the peak velocity and the distance of the peak velocity from the surface as a function of the distance from the exposed electrode. The results are shown in FIGS. 13A-13B. The peak velocity decays approximately linearly with distance from the exposed electrode. The left axis shows the velocity in physical units. The fight axis shows the peak velocity normalized by our nominally expected $u_r$ for the boundary layer at Mach 0.1 that was given in Table 1 shown in FIG. 10. With $u_r=1$ being a rough threshold for effect, this indicates that a distance of approximately 20 mm is the maximum useful dimension of the covered electrode.

FIG. 13B shows the location of the peak velocity from the surface as a function of the distance from the exposed electrode. The left axis is the physical height. The right axis indicates the height of the velocity peak normalized by the nominally expected, y at y+=100 for the boundary layer at Mach 0.1 that was given in Table 1 shown in FIG. 10. Now y+=100 is considered to be the edge of the buffer layer in a turbulent boundary layer. Based on these results, the peak velocity is only confined to that region up to 4 mm. from the exposed electrode.

Figure 14A:
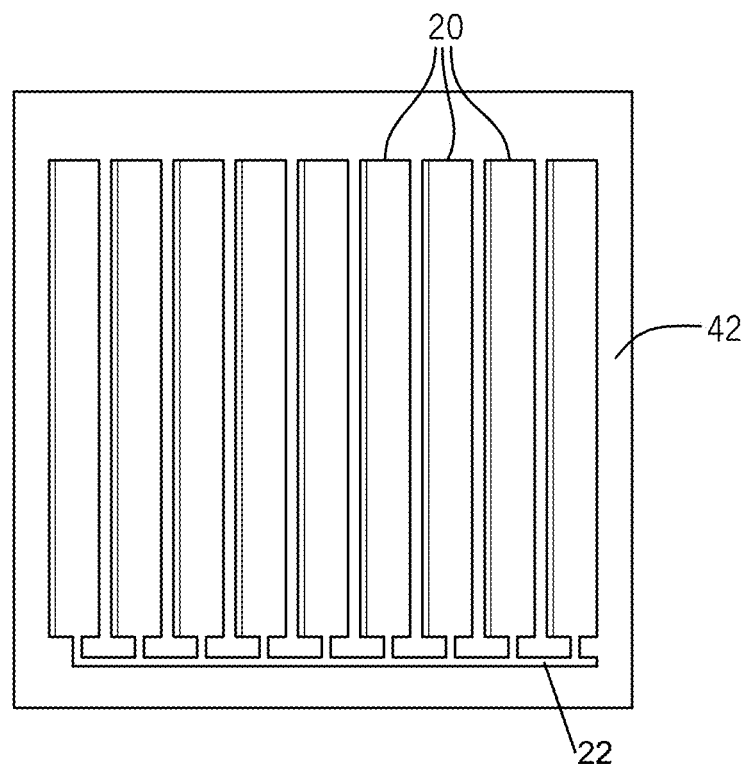
FIG. 14A is an example embodiment of a plasma plate according to the principles of this disclosure.
Figure 14B:
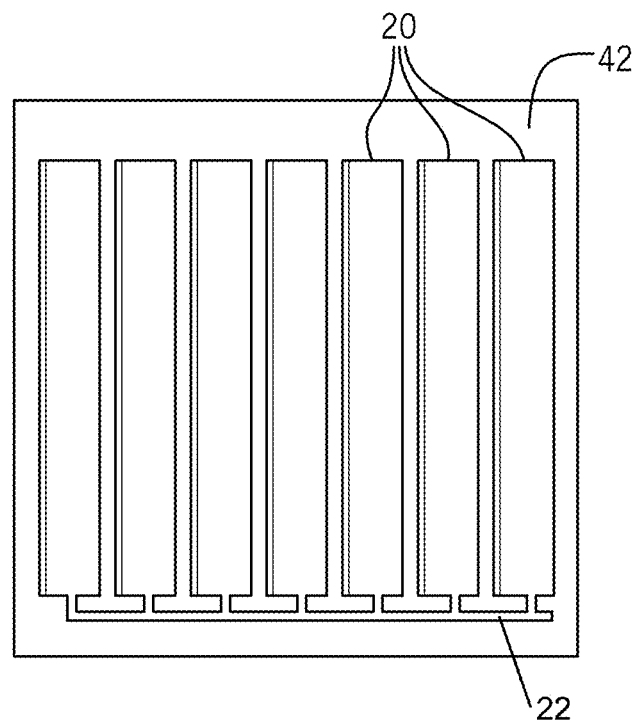
FIG. 14B is an example embodiment of a plasma plate according to the principles of this disclosure.

Based on these results, two plasma plate designs were fabricated. Top-view schematic drawings of the two designs for the plasma plate 42 are shown in FIGS. 14A-14B, where all dimensions are in millimeters. In each, the plasma plate 42 exhibits a series of plasma actuators 12 arranged in ordered rows. The plasma actuators are so ordered to focus and direct their velocity inducing effect into a unified control of the vorticity of the fluid flow around the wall.

The outer edge in each design matches the 9 in. (228.6 mm) square size of the measurement plate. The schematics show the outlines of the covered electrodes as well as the locations of the exposed electrodes when placed on one edge of the covered electrode for the "spanwise blowing" configuration. In the design for the plasma plate 42 in FIG. 14A, the width of the covered electrode is 16 mm. The design for the plasma plate 42 shown in FIG. 14B has covered electrodes with a width of 24 mm. In each case the width of the covered electrode is the minimum 2 mm found by the bench-top experiments to prevent plasma from forming on the opposite edge from the covered electrode. Similarly, the spacing between the covered electrodes was 7 mm so that the spacing between the edge of the neighboring covered electrode and the next exposed electrode was the 5 mm found to be needed to also prevent unwanted plasma from forming. The covered electrodes were connected in parallel by a common bus line located in the bottom part of the schematics.

The pattern for the covered electrodes and their connection bus 22 were machined into a 6.35 mm thick sheet of Gil Garolite. This produced a recess for the 4 mm thick copper foil tape (2 mm thick copper and 2 mm thick glue layer) used for the covered electrode and connection bus 22.

Figure 15A:
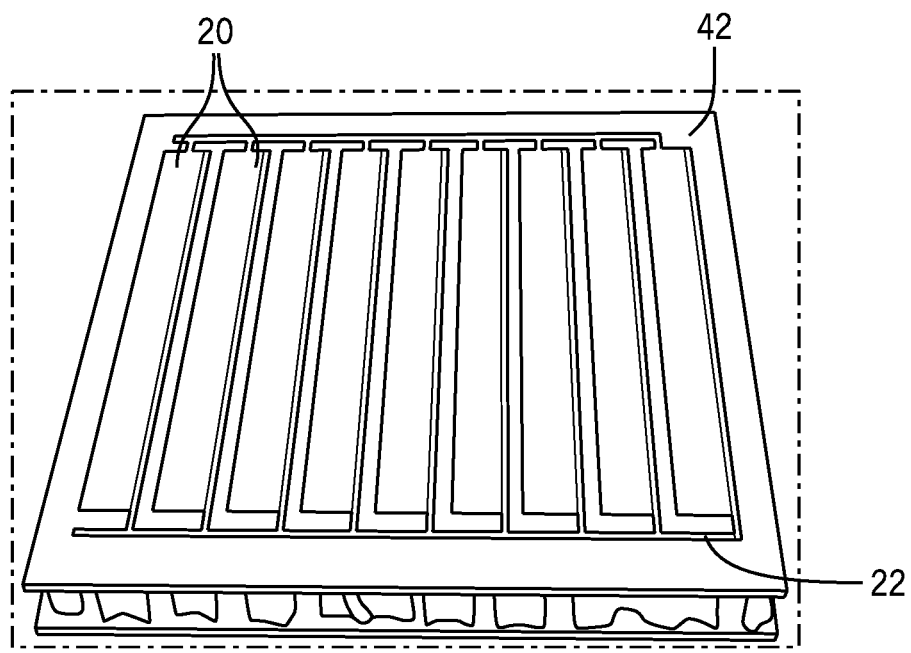
FIG. 15A is a photograph of the example embodiment of the plasma plate.
Figure 15B:
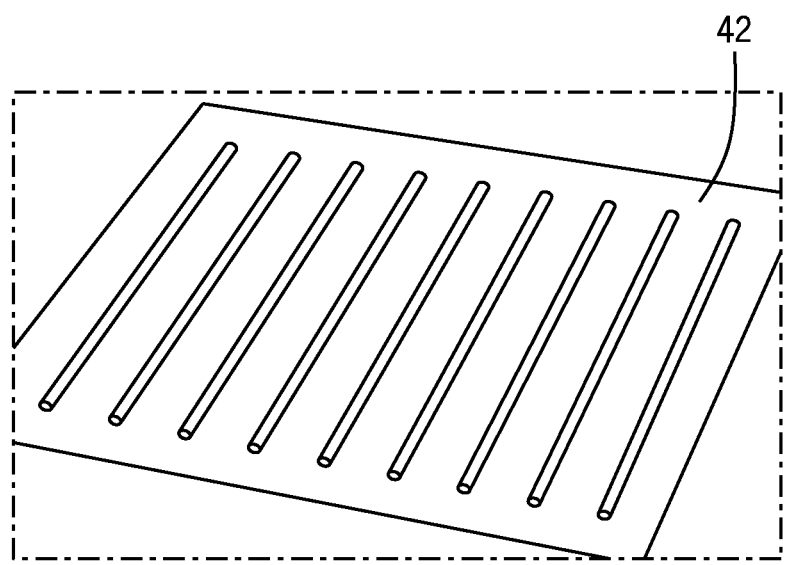
FIG. 15B is another photograph of the example embodiment of the plasma plate operating.

This allowed a smooth surface on which the dielectric film was applied. The dielectric was a continuous sheet of 3 mm thick Ultem that was glue-backed. The exposed electrodes were also fabricated from the copper foil tape. The pattern was applied to the surface of the Ultem film. A connection bus that was similar to that of the covered electrode was used to distribute the power to the exposed electrodes. FIG. 15A shows a photograph of the fully assembled plasma plate with 16 mm covered electrodes showing the linear ordered rows of plasma actuators 20. Each assembly was mounted onto a flat honeycomb plate that was designed to be held in the drag force measurement setup. These honeycomb plates were previously used to measure baseline drag in a separate ongoing study performed with the NASA Langley Acoustic Lining Team. FIG. 15B shows the plasma plate 42 while operating with the pulsed-DC on a bench-top in a darkened lab.

Figures 16, 17A:
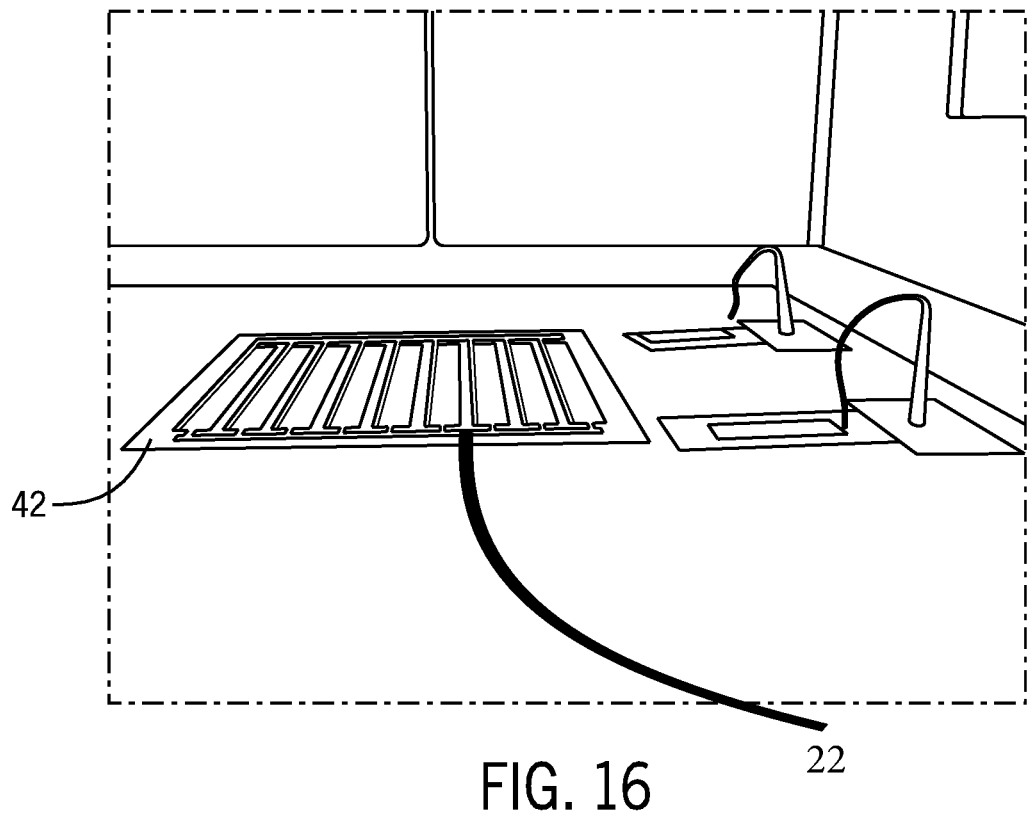
FIG. 16 is a photograph of the example embodiment of the plasma plate in the wind tunnel.
FIG. 17A is a table of the configurations of the plasma plate showing the electrode location.

The plasma plate assemblies were mounted to the drag force measurement setup in the wind tunnel. A photograph of the plasma plate 42 with 16 mm covered electrodes and exposed electrodes located on the edge of the covered electrode is shown in FIG. 16. This is viewed looking in the downstream directions towards the exit of the test section. The power bus for the exposed electrodes is on the downstream back edge of the plasma plate to minimize any flow disturbances it might produce. The power to the plasma plate was supplied through two 30 gauge coated wire leads, with one each connected to the covered and exposed electrode power bus. These thin wires are visible on the right side of the photograph. The thin wires were chosen to produce a minimum amount of drag on the plasma plate.

As previously indicated, two plasma plate designs were fabricated that had covered electrode widths of 16 mm and 24 mm. Configurations of the plasma plate are detailed in the Tables 2-5 shown in FIGS. 17A-17D. With each of these there were two exposed electrode configurations. In one, the exposed electrode was located on the edge of the covered electrode to produce uniform spanwise blowing. In the other configuration, the exposed electrode was located in the spanwise center of the covered electrode. This arrangement would produce opposing spanwise blowing with a stagnation line in the space between neighboring covered electrodes. These configurations are summarized in Table 2 shown in FIG. 17A.

In each of the four configurations, the free-stream Mach number was varied from 0.05 to 0.12. At each Mach number, the plasma panel was operated at DC voltages from 4 kV to 8 kV. In all cases the pulsing frequency was 512 Hz. For each experimental condition, the output from the drag-measuring load cell was continuously acquired for a period of time that was sufficient to calculate a stable time-averaged (mean) value. This was typically a 30 second average. The output from the load cell was also acquired with the plasma plate operating without flow. The average reading without flow was then subtracted from the reading with flow to ensure that the drag reading with the plasma plate operating with flow did not include any effect of electronic noise. This process was performed for every one of the plasma plate operating voltages.

The power delivered to the plasma plates in each of the four configurations at all of the voltages was determined using a 500 MHz Lecroy digital oscilloscope to acquire the voltage and current time series. The voltage was measured using a Lecroy high voltage probe that was connected to the power lead to the covered electrode. The current was measured using an inductive current sensor that was located on the power lead to the exposed electrode. The time series from both sensors were stored and post-processed. This is the time series that was shown in FIG. 8. This is representative of all of the time series at all of the voltages used in the experiment.

Analysis of the voltage and current traces indicates that except within the current pulse, the current is zero. During the current spike, the voltage potential is the maximum DC level. If the period during the current peak is expanded in time, the width of the pulse can be determined.

This represents the duty cycle of the periodic process. Table 4 shown in FIG. 17C lists the DC pulse widths based on the current traces, and the corresponding duty cycle percentage of the 512 Hz pulsing frequency for the four plasma plate configurations for the range of voltages used in the experiments. The method of calculating power then consisted of taking the product of the peak current, peak voltage, and duty cycle. Table 4 summarizes the power delivered to the four plasma plate configurations for the range of voltages used in the experiments. The power is measured Watts as well as the power normalized by the total length of the generated plasma, which for the edge configuration is assumed to be the total length of the electrode times the number of exposed electrodes. This length is doubled for the centered electrodes, since in that case the plasma was generated on both sides of the exposed electrode.

The following provides a design for the pulsed-DC plasma actuator drag reducing plate for Mach numbers up to the 0.6 maximum of the Notre Dame Mach 0.6 wind tunnel. The design is based on the same 228.6 mm (9 in.) square plate that was used in the Phase I experiments.

Based on the Phase I experiment, the optimum spacing of the plasma actuator exposed electrodes corresponds to a $z_-=1000$. The physical spacing scales with Mach number as $M^{-0.92}$, therefore the spacing decreases with increasing Mach number. These are given as a function of Mach number in the second column of Table 5. The Phase I experiments validated that the pulsed-DC actuator provided the control to allow use of the centered electrode configuration. This configuration scales down more easily than the spanwise blowing configuration because (1) it can be applied over a single covered electrode and (2) the effective electrode spacing is twice the $z+=1000$ requirement, meaning the electrodes can be placed twice as far apart compared to the spanwise blowing arrangement. Column 3 in Table 5 gives the centered electrode spacing as a function of Mach number. Based on the spacing between electrodes at each Mach number, Column 4 in the table gives the number of electrodes in the spanwise direction that would cover the 228.6 mm square plate (leaving a border of approximately 15 mm). The plasma will form on both sides of the exposed electrodes. Therefore the length of plasma corresponds to twice the length of each exposed electrode time the number of electrodes. The total plasma length as a function of Mach number is given in Column 5 of Table 5.

Table 4 lists the power-per-meter length for each of the electrode configurations of the plasma plate 42. The average W/m of the four configurations at a DC voltage of 6 kV was used to estimate the required power to the actuator as a function of Mach number. The optimum voltage in the Phase I experiments was found to be between 5 kV to 6 kV. That optimum voltage was not found to be sensitive to the Mach number. This is consistent with one of the physical interpretations that the wall longitudinal streaks are the result of an instability, in which a small velocity perturbation is sufficient to disrupt their formation. Column 6 in Table 5 then lists the plasma actuator power based on the 6 kV average W/m of pulsed-DC plasma.

The drag on the 228.6 mm square plasma plate 42 at its Phase I location in the test section for the naturally developing turbulent boundary layer was estimated for the range of Mach numbers 0.1 to 0.6. The power associated with the drag is listed in Column 7 of Table 5. The drag power scales as $M^3$ so that it is dramatically increasing with Mach number. If it is assumed that the 60% drag reduction observed in Phase I was achieved at all of the Mach numbers in the table, then Column 8 lists the power associated with 60% of the drag. The net power reduction is then the ratio of the power in 60% of the drag on the plate, divided by the estimate of the power supplied to the plasma plate. This is the ratio of the values in Columns 8 and 6. The result is given in Column 9 of Table 5. The values in Column 9 are plotted as a function of the free-stream Mach number in FIG. 16. The estimates are remarkable with the potential of a 4500% net drag reduction at Mach 0.6. Even if the estimates of the plasma power were off by an order of magnitude, the net drag reduction would still be an impressive 450%.

In summary, the spacing between the electrodes and the power requirements for the 228.6 mm square plate are easily feasible to fabricate and test at Mach numbers up to 0.6 in the Phase II.

This section presents the results of a series of experiments performed in the Notre Dame Mach 0.6 wind tunnel that is focused on the demonstration of turbulent boundary layer skin friction drag reduction. The experiments are performed in a zero pressure gradient (ZPG) fully turbulent boundary layer for a range of incompressible Mach numbers. Relevant boundary layer parameters are provided in Table 6. Four actuator designs are considered and the focus of each is to intervene in the streak transient growth instability (STGI) mechanism that forms the basis for the self-sustaining mechanism of wall turbulence production. Two of the actuator designs use the body force produced by a low power, new revolutionary actuator to create a unidirectional spanwise flow in the near-wall region of the ZPG boundary layer in order to smooth low speed streaks and thereby prevent STGI. As noted previously, these differ only in terms of surface inter-electrode spacing (16 mm and 24 mm). The second design uses the new revolutionary actuator with an electrode arrangement that produces a series of spanwise opposed wall jets that are confined to the near-wall region. Again, the focus of the flow control strategy was to smooth low-speed streaks and thereby prevent STGI.

Figure 1:
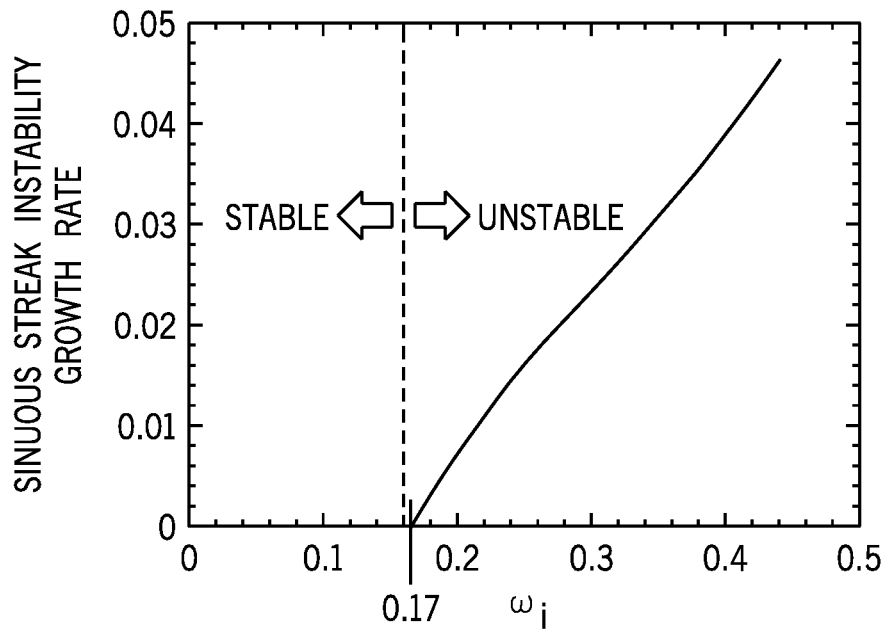
FIG. 1 is a chart showing the prior art showing the dependence of sinous streak instability growth rate on streak flanking wall-normal vorticity.
Figure 18:
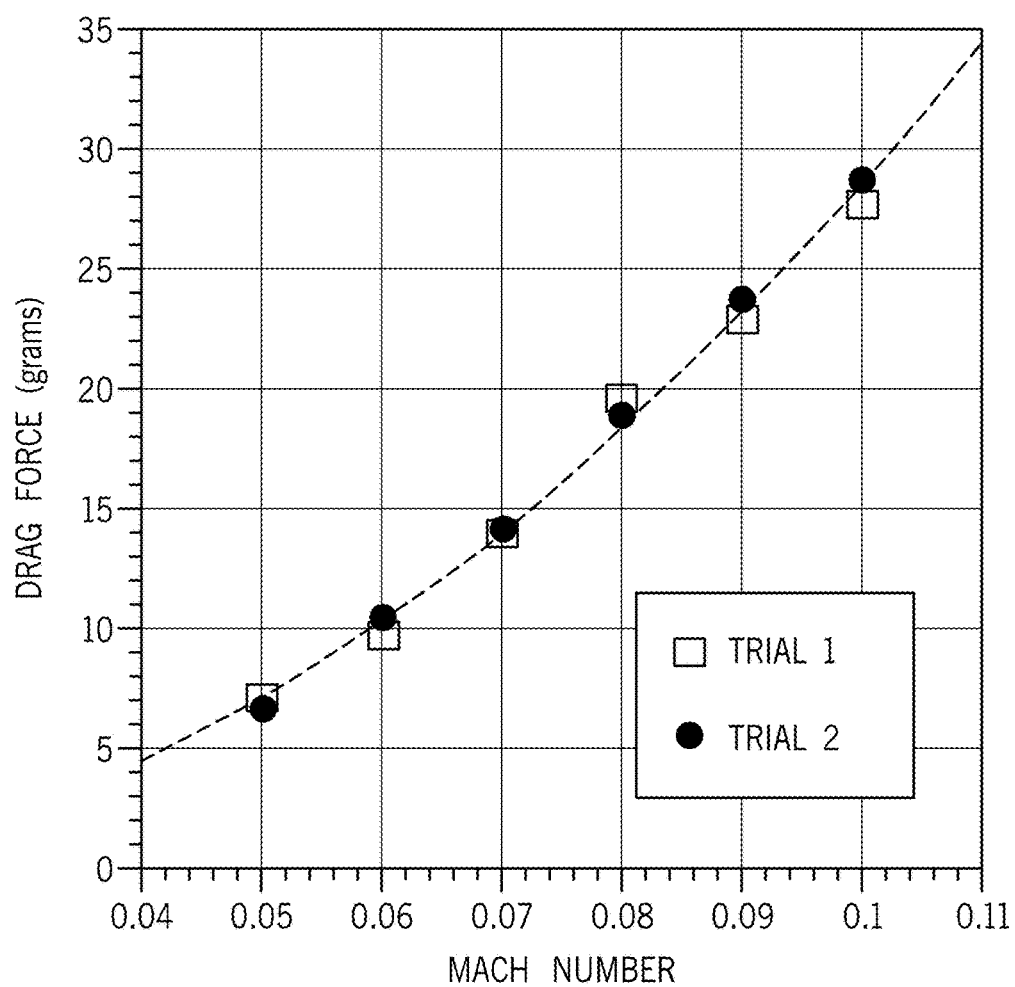
FIG. 18 is a chart of baseline drag measurements without flow control as a function of freestream drag number.

FIG. 18 presents two sample baseline drag measurements without plasma flow control. These baseline measurements give an indication of the high level of repeatability of the drag measurements as well as their expected variation with M as evidence by the quadratic fit (dashed line). Furthermore, trial 1 was obtained with the 24 mm unidirectional actuator installed and trial 2 with the 24 mm opposed wall jet actuator. The agreement with the analysis shown in FIG. 1 indicates that the surface electrodes were sufficiently hydrodynamically smooth so as to have negligible effect on skin friction drag.

The following sections summarize the results of revolutionary new actuator based drag reduction experiments for both the unidirectional and opposed wall jet actuators.

Figure 19A:
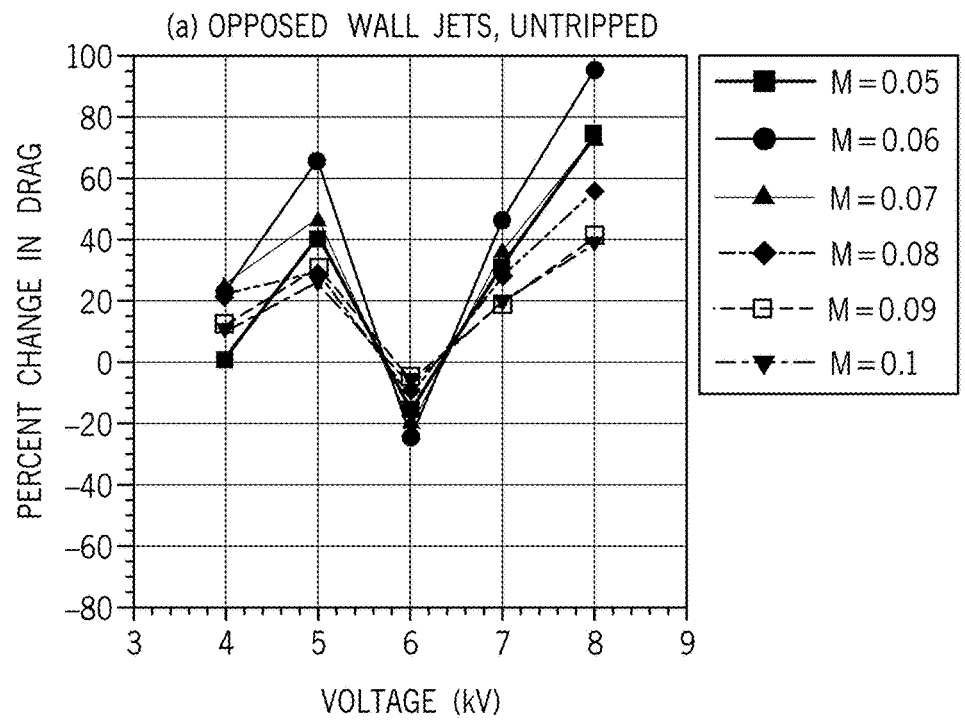
FIG. 19A is a graph showing the percent change in drag reduction for the untripped ZPG TBL for the 16 mm opposed electrode.
Figure 19B:
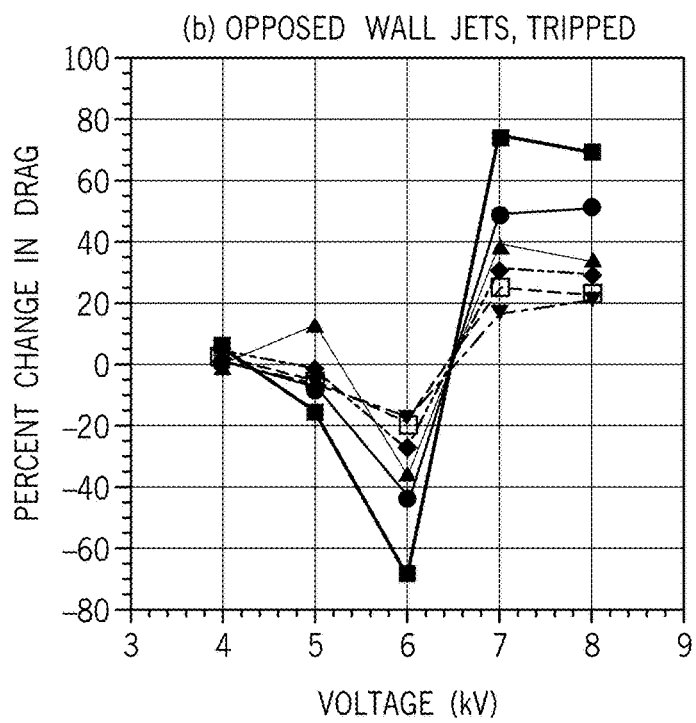
FIG. 19B is a graph showing the percent change in drag reduction for the untripped ZPG TBL for the 16 mm opposed electrode.

FIGS. 19A-19B presents the measured percentage change in skin friction drag as a function of applied voltage for the 16 mm opposed wall jet actuator (i.e. centered surface electrode). Experimental results over the freestream Mach number range $0.05<M_\infty>0.1$ are shown. FIG. 19A presents results for the untripped approach boundary layer case. FIG. 19B presents results with the approach boundary layer thickened by a small rectangular trip placed 2.2 m upstream of the actuator leading edge. The primary effect of the trip was to approximately double the thickness of the approach boundary layer (e.g. from $\delta=44$ mm to $\delta_{trip}=99$ mm at $M_\infty=0.05$) which also had the intended effect of increasing the near-wall low speed streak spacing. FIG. 19A shows that skin friction drag reduction occurs at each Mach number for an applied actuator voltage of 6 kV. The applied actuator voltage being the difference between the voltage at the covered electrode and the voltage at the exposed electrode. A maximum drag reduction of 23% occurs for $M_\infty=0.06$ with smaller reductions occurring at higher Mach numbers. It is important to note that the effect of the actuation is to increase drag for all Mach numbers with higher applied voltages of 7 kV or 8 kV. This is likely due to local upwelling s that are generated by the colliding wall jets at the highest applied voltages. This would serve to significantly increase the production of wall-normal component vorticity through increased spanwise near-wall velocity gradients, $\partial U/\partial z$, and thereby promote STGI. Thus, unlike separation control applications where increased actuator authority generally has a positive effect, FIG. 19A shows that STGI control is very sensitive to applied voltage. FIG. 19A also shows increased drag at the lower applied voltage of 5 kV. It is speculated that this is due to the opposing wall jets having insufficient authority to smooth low speed streaks (as in the 6 kV case) and instead promoting spanwise inhomogeneity of the streamwise velocity through a localized wall jet influence near each surface electrode. FIG. 19B presents the percent change in skin friction drag with the approach boundary layer boundary layer tripped. Again, drag reduction occurs at all Mach numbers for an applied actuator voltage of 6 kV but the reductions are much larger; up to nearly 70% at $M_\infty=0.05$. Although the percent drag reduction decreases systematically at higher Mach numbers, it remains significant even at the highest Mach number; 17% at $M_\infty=0.1$. As in the untripped case, higher applied voltages give rise to significant drag increases due to upwellings from energetic colliding wall jets. Unlike the untripped case shown in FIG. 19a, lower levels of drag reduction also occur at 5 kV.

Figure 20:
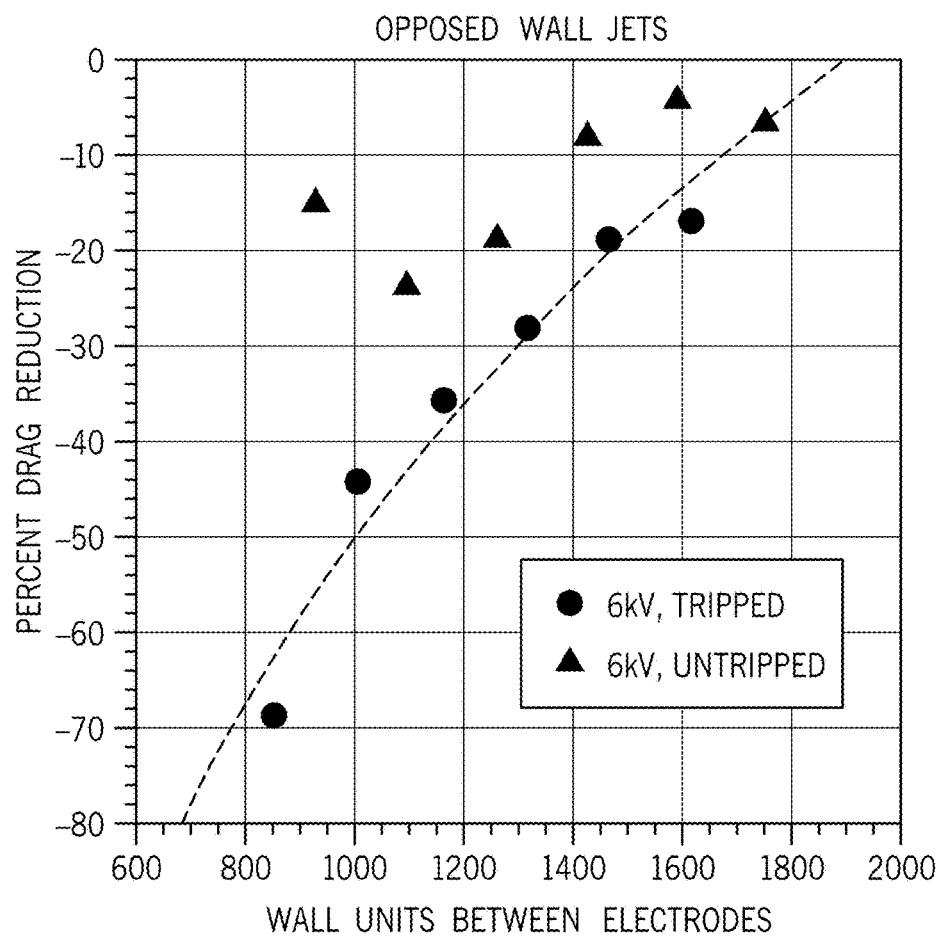
FIG. 20 is a graph showing the percent change in drag reduction as a function of vicious wall units for the 16 mm opposed electrode.

In order to address the systematic variation in drag reduction with Mach number noted for the 6 KV actuation cases shown in both FIG. 19, FIG. 20 presents the percent drag reduction as a function of the (calculated) number of viscous wall units ($v/u_\tau$) between the surface electrodes. This figure shows that the greatest drag reduction occurs when the inter-electrode spacing encompasses 800-1000 wall units, which would correspond to the control of 8-10 low speed streaks. For an inter-electrode gap equal to 2000 wall units (i.e. 20 low speed streaks) drag reduction is nearly lost. The dashed line in FIG. 20 shows that the percentage drag reduction varies approximately logarithmically with inter-electrode streak spacing.

Figure 21A:
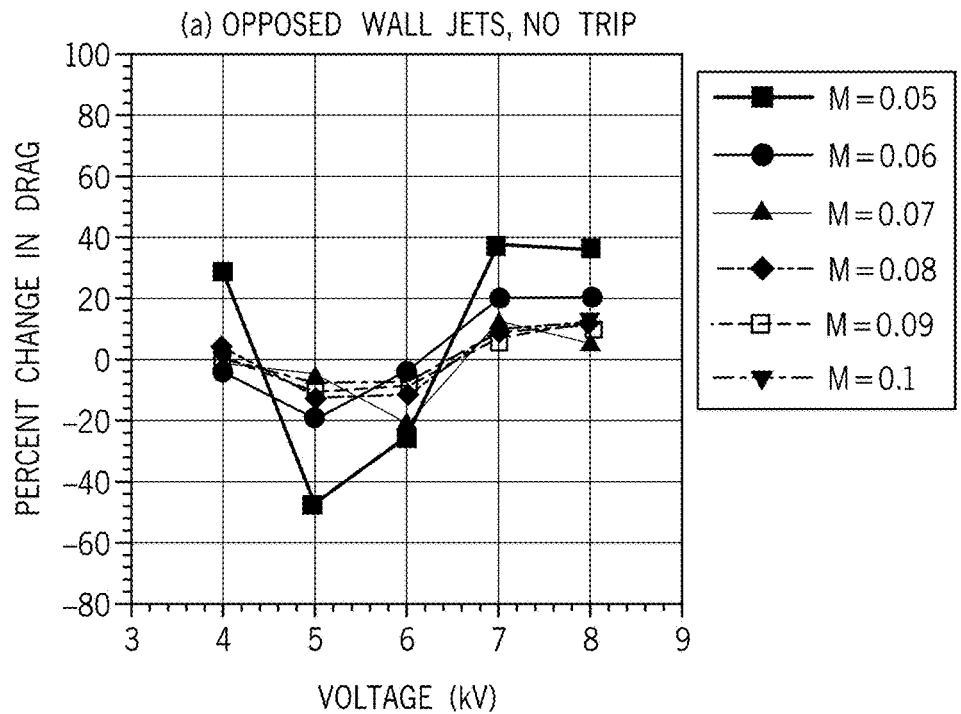
FIG. 21A is a graph showing the percent change in drag reduction for the untripped ZPG TBL for the 24 mm opposed electrode.
Figure 21B:
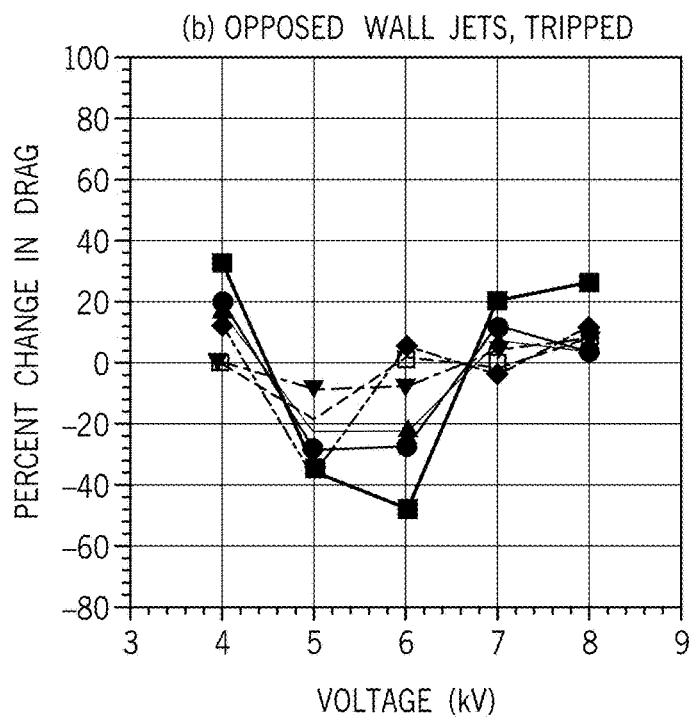
FIG. 21B is a graph showing the percent change in drag reduction for the untripped ZPG TBL for the 24 mm opposed electrode.

FIGS. 21A-21B presents the measured percentage change in skin friction drag as a function of applied voltage for the 24 mm opposed wall jet actuator (i.e. centered surface electrode). As before experimental results over the freestream Mach number range $0.05<M_\infty>0.1$ are shown. FIG. 21A presents the results for the untripped TBL. The drag reduction behavior is qualitatively similar to that shown previously for the 16 mm opposed wall jet case. Drag reduction occurs for applied voltages of 5 and 6 kV with increased drag occurring at the highest voltages of 7 and 8 kV. As described previously, this drag increase is likely due to upwellings generated by colliding spanwise wall jets that serve to promote STGI. Peak drag reduction is 47% at $M_\infty=0.05$ and 5 kV applied voltage. However, drag reductions of approximately 20% are noted for M=0.06 and 0.07 for applied voltages 5 and 6 kV, respectively. Even at $M_\infty=0.1$ the drag reduction is 7% at 5 and 6 kV. FIG. 21B presents experimental results for the tripped TBL. Overall the drag reduction performance is improved by the tripping and this shows that this is associated with a reduction in the number of low-speed streaks between surface electrodes. Peak drag reduction is 47% at $M_\infty=0.05$ for the 6 kV case. Comparison of FIG. 21A and FIG. 21B show that drag reduction at higher Mach numbers is greater for the tripped case. For example, the drag reduction is 36% at $M_\infty=0.08$ for 5 kV applied voltage. Reductions in excess of 20% are observed for $M_\infty=0.06$ and 0.07. As before the highest applied voltages show a detrimental effect with significant increases in drag (e.g. nearly 40% at $M_\infty=0.05$ for 7 and 8 kV).

Figure 22:
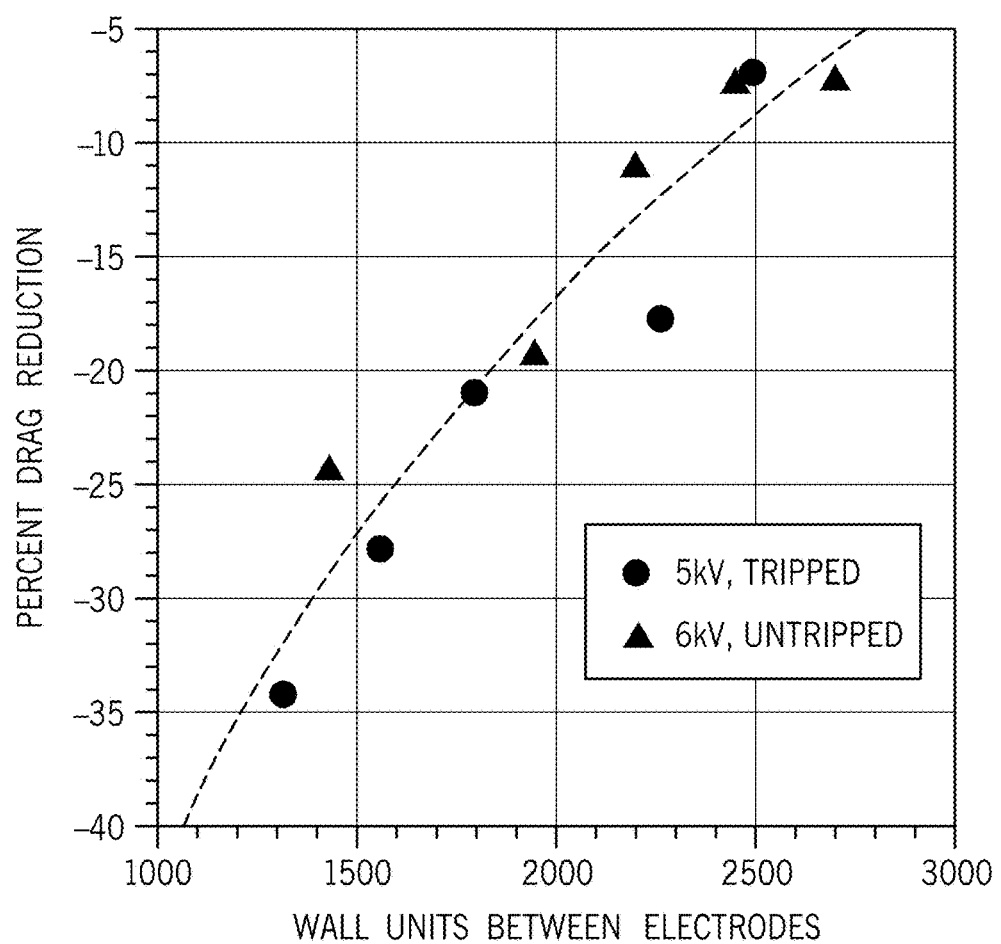
FIG. 22 is a graph showing the percent change in drag reduction as a function of visious wall units for the 24 mm opposed electrode.

FIG. 22 presents the percent drag reduction as a function of the (calculated) number of viscous wall units ($v/u_\tau$) between the surface electrodes for the 24 mm opposed wall jet case. This figure shows that the greatest drag reduction is associated with approximately 1000 wall units between the surface electrodes (i.e. control of 10 low-speed streaks). As the number of low-speed streaks between surface electrodes increases the percent drag reduction is diminished, varying approximately logarithmically. For 20-25 low speed streaks, drag reduction is reduced to between 5-10%

Figure 23A:
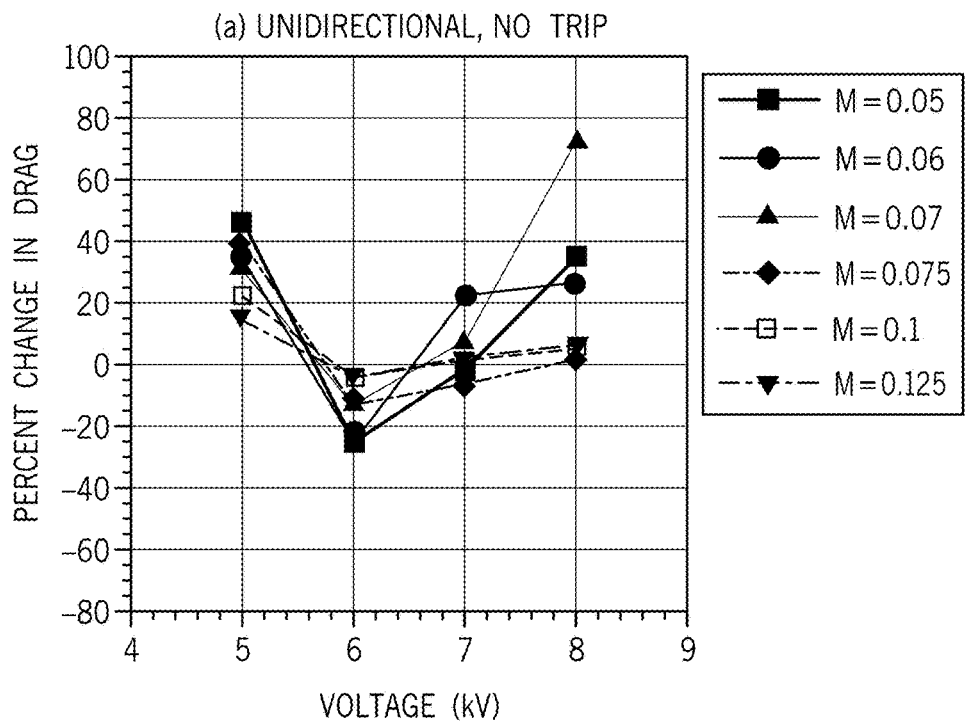
FIG. 23A is a graph showing the percent change in drag reduction for the untripped ZPG TBL for the 16 mm unidirectional electrode.
Figure 23B:
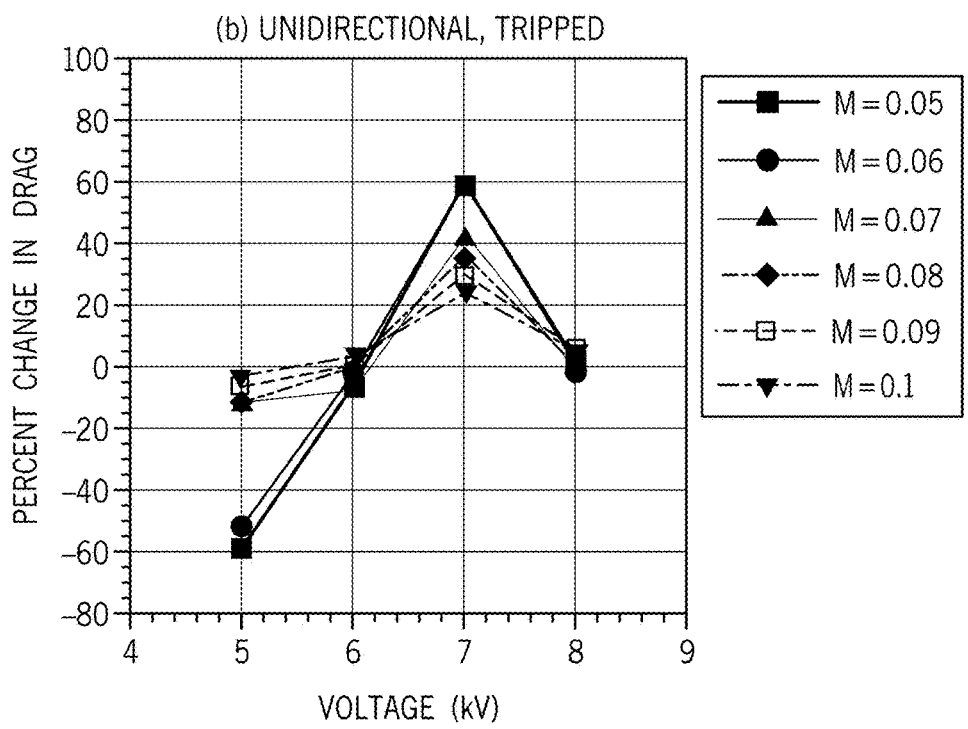
FIG. 23B is a graph showing the percent change in drag reduction for the untripped ZPG TBL for the 16 mm unidirectional electrode.

FIGS. 23A-23B presents the measured percentage change in skin friction drag as a function of applied voltage for the 16 mm unidirectional spanwise wall jet actuator. Experimental results over the freestream Mach number range $0.05 \leq M_\infty \leq 0.125$ are shown. The untripped TBL case is shown in FIG. 23A. This figure shows that unidirectional spanwise wall jets are also capable of producing drag reduction which occurs for the 6 kV applied voltage. Maximum drag reduction of 24% is measured for both $M_\infty=0.05$ and 0.06 with lesser amounts at higher Mach numbers. The actuation is shown to increase drag at both the lowest and highest applied voltages tested. The increase at 5 kV is possibly due to insufficient wall jet velocity which provides a near-electrode localized control effect that gives rise to spanwise gradients, $v/u_\tau$, across the inter-electrode gap that promotes STGI. At the highest voltage the wall jet likely is not confined to the near-wall region across the entire inter-electrode gap, thereby increasing drag. Significant increases in drag are shown to occur for 7 kV applied voltage.

FIG. 23B presents experimental results for the 16 mm unidirectional actuator with the tripped TBL. Peak drag reduction is now much greater than in the untripped case and occurs at the lower applied voltage of 5 kV. Peak drag reduction is 58% at $M_\infty=0.05$ and 51% at $M_\infty=0.06$ with values between 16% and 4% at the higher Mach numbers.

Figure 24:
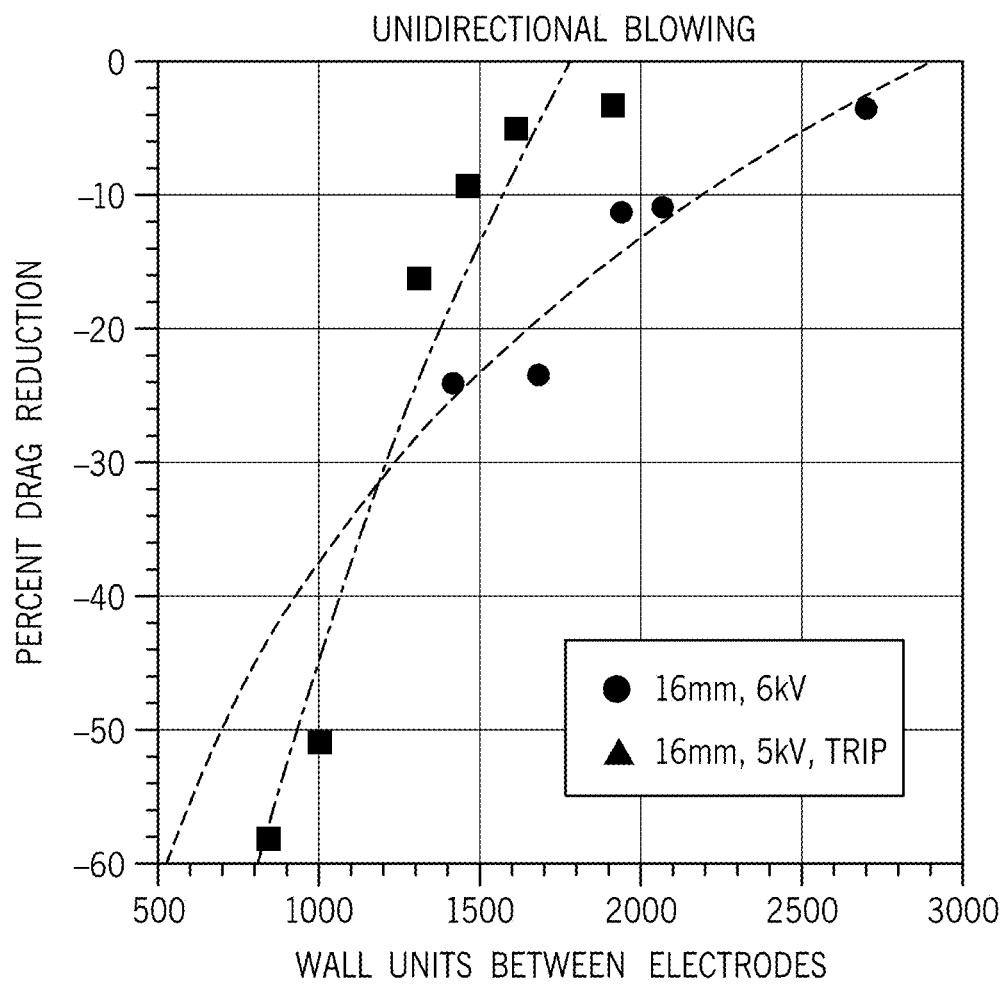
FIG. 24 is a graph showing the percent change in drag reduction as a function of visious wall units for the 16 mm unidirectional electrode.

FIG. 24 presents the percent drag reduction as a function of the (calculated) number of viscous wall units ($v/u_\tau$) between the surface electrodes for the 16 mm unidirectional wall jet case. In both tripped and untripped cases, the degree of drag reduction is again reduced as the number of wall units between the electrodes grows. The largest drag reduction occurs around 1000 wall units (i.e. ten low-speed streaks) as was the case for the opposed wall jet actuators.

Figure 25A:
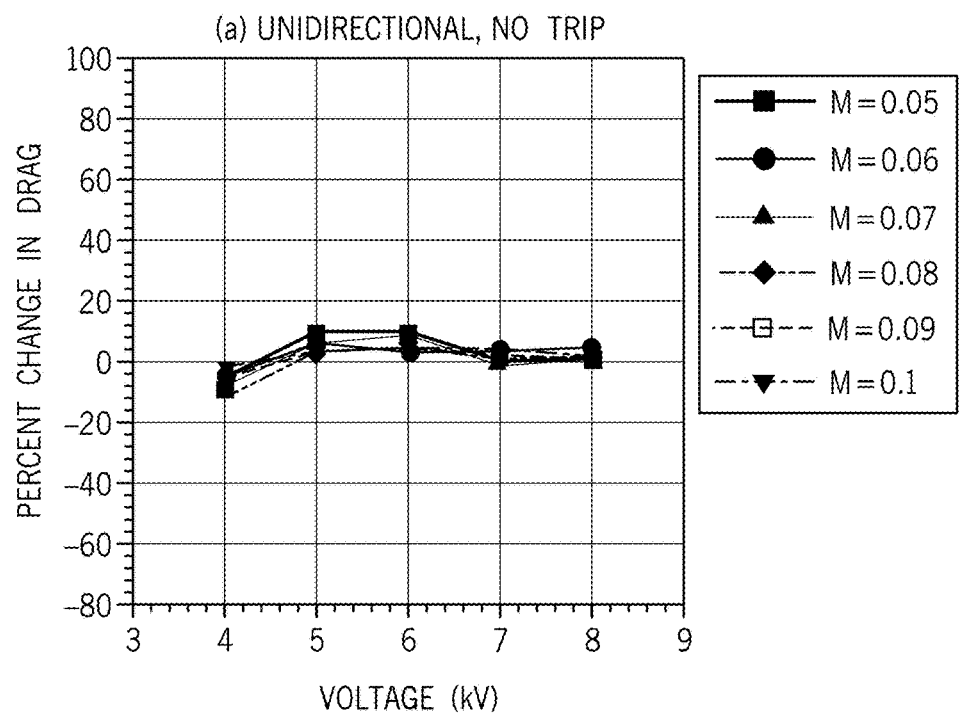
FIG. 25A is a graph showing the percent change in drag reduction for the untripped ZPG TBL for the 24 mm unidirectional electrode.
Figure 25B:
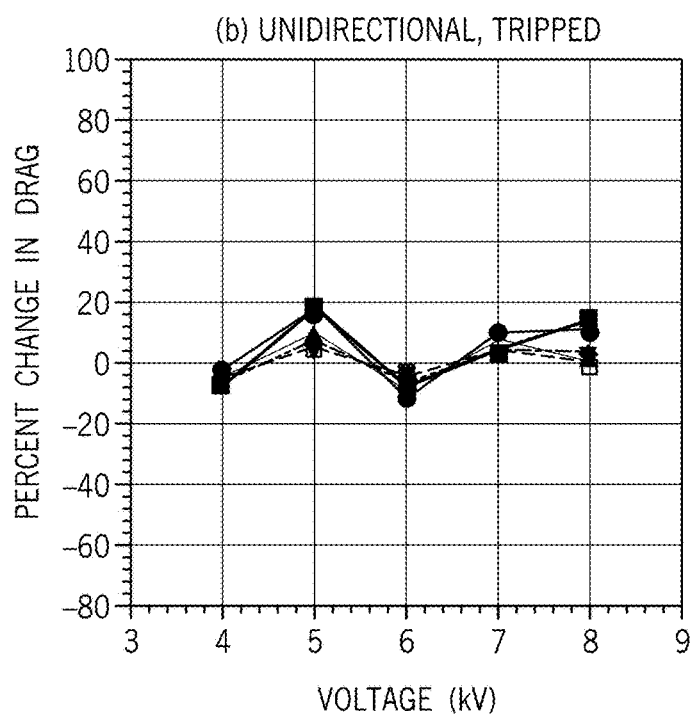
FIG. 25B is a graph showing the percent change in drag reduction for the untripped ZPG TBL for the 24 mm unidirectional electrode.

FIG. 25A-25B presents the measured percentage change in skin friction drag as a function of applied voltage for the 24 mm unidirectional spanwise wall jet actuator. Experimental results over the freestream Mach number range $0.05 \leq M_\infty \leq 0.1$ are shown. The untripped TBL case is shown in FIG. 25A. The only drag reduction in this case occurs at the lowest applied voltage of 4 kV and does not exceed 11% which occurs for $M_\infty=0.08$. Comparison with FIG. 23A indicates that the 24 mm unidirectional actuator is not as effective as the 16 mm version. This suggests that the unidirectional actuators will function best with small surface inter-electrode gaps. The tripped TBL case is presented in FIG. 25B. Maximum drag reduction now occurs at 6 kV but does not exceed 11%.

The new revolutionary actuators were examined in terms of not only percent drag reduction but also in terms of power savings versus power input to the actuators. The goal was to determine if the actuators were capable of achieving net power savings.

The power savings due to the plasma actuator, $\Delta P$, is given by, $$M_\infty = \Delta P = P_{off}(DR) \quad (1)$$

Where $P_{off}=D_{off}V_\infty$ is the power lost due to skin friction drag with the actuator off and DR is the fractional drag reduction due to the actuator. Denoting the power input required to operate the actuator as $P_{in}$ for net power savings, it is required that $$\frac{\Delta P}{P_{IN}} = \frac{P_{off}(DR)}{P_{IN}} \quad (2)$$

Of course the best one could achieve would be to have 100% drag reduction in which case (2) becomes, $$\frac{\Delta P}{P_{IN}} = \frac{P_{off}}{P_{IN}} \quad (3)$$

Figure 26:
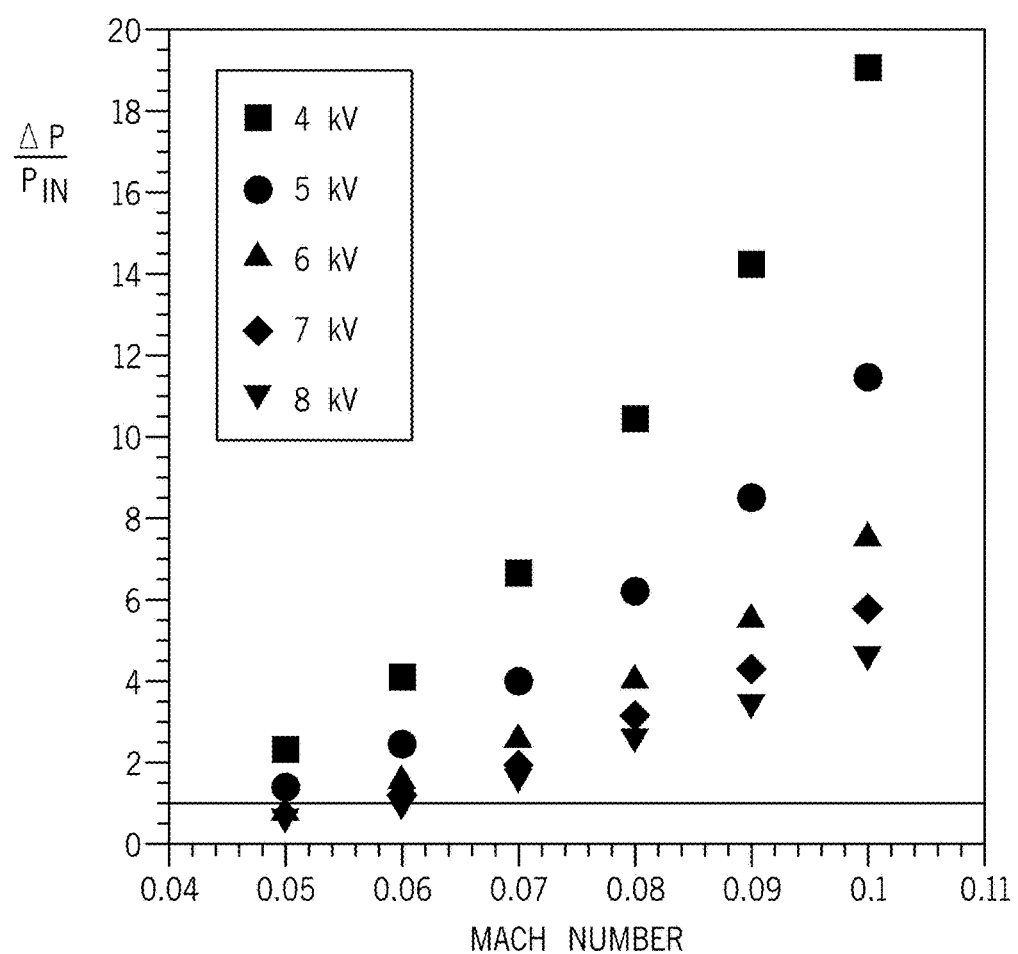
FIG. 26 is a graph showing the percent change in drag reduction as a function of visious wall units for the 24 mm unidirectional electrode.
Figure 27:
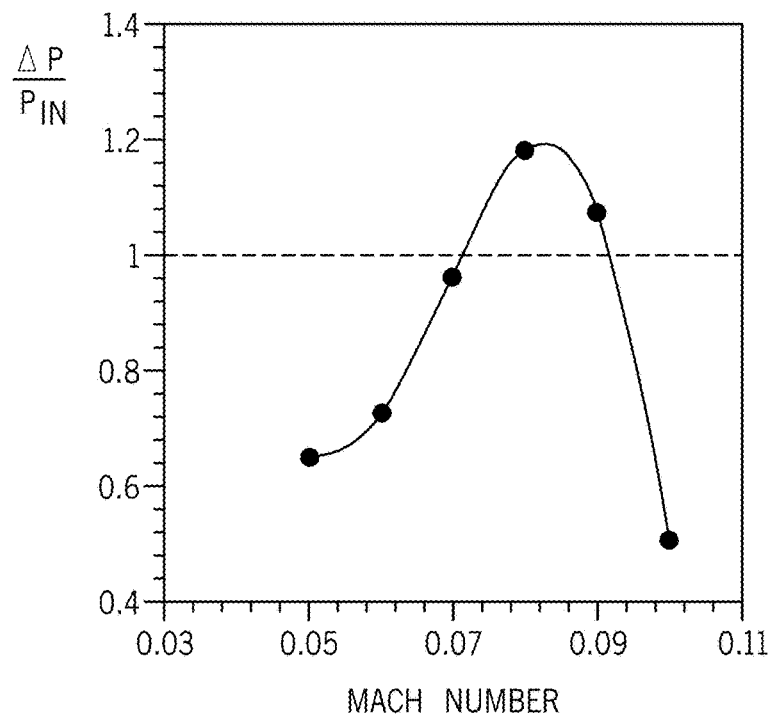
FIG. 27 is a graph showing the optimal power savings for the opposed wall jet configuration.

As an example, this quantity was calculated for the opposed wall jet actuator and is plotted in FIG. 26. This figure shows (1) that at a given Mach number the maximum potential power savings decreases rapidly with applied voltage and (2) at fixed voltage, maximum benefit in terms of net power savings occurs at higher Mach number. In order to calculate the net power savings the values shown in FIG. 26 need only be multiplied by the appropriate values of the fractional drag reduction. As an example, FIG. 27 presents net power savings, $\Delta P/P_{IN}$ as a function of Mach number for the 16 mm opposed wall jet actuator operated at 6 kV with the TBL tripped. Although the drag results shown previously in FIG. 19B are most impressive at the lower Mach numbers, FIG. 27 shows that the net power savings actually occurs between $M_\infty=0.072$ and 0.095.

Figure 28:
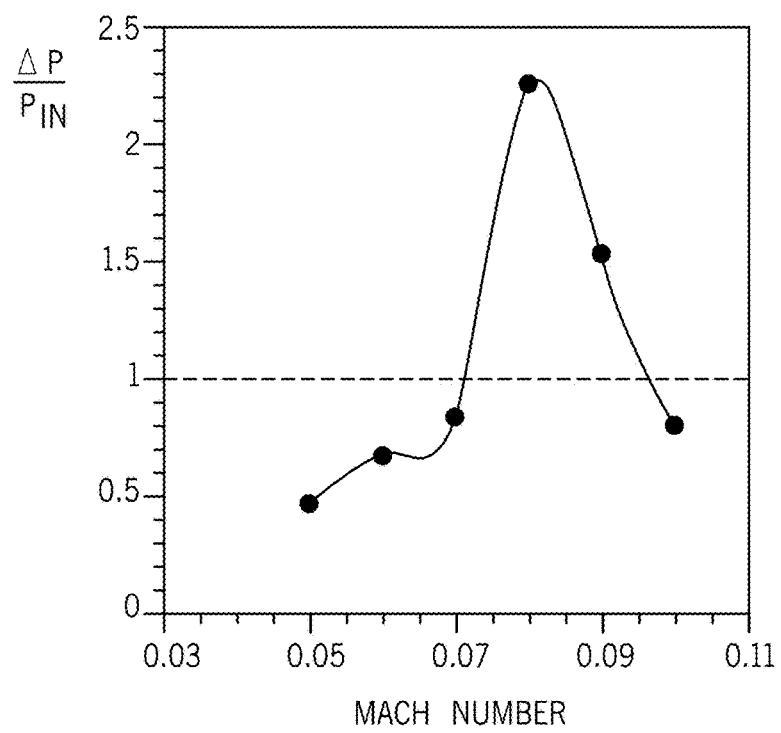
FIG. 28 is a chart showing the net power savings of the 16 mm opposed electrode configuration operating at 6 kV.
Figure 29:
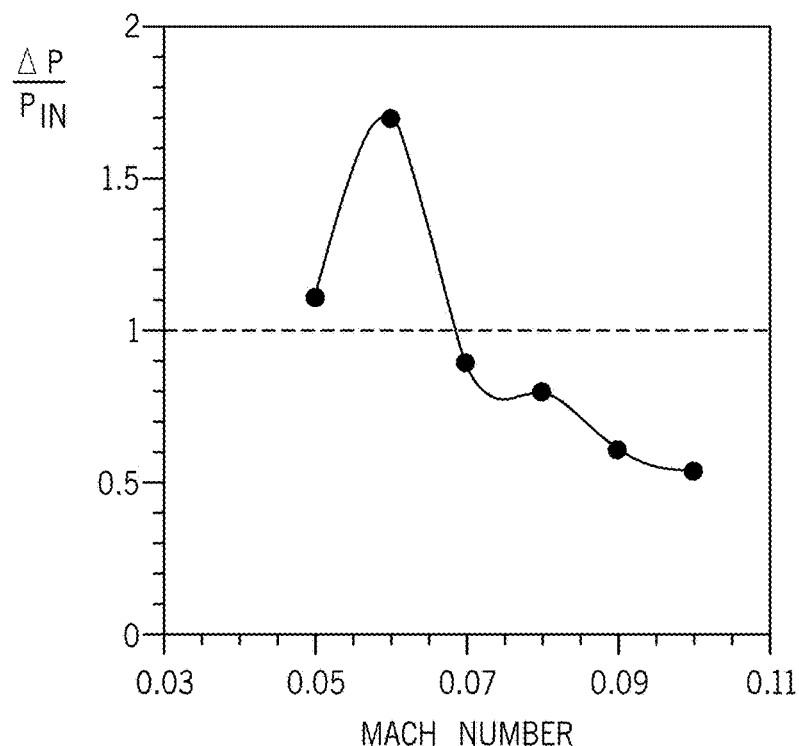
FIG. 29 is a chart showing the net power savings of the 24 mm opposed electrode configuration.

FIG. 28 presents net power savings, $\Delta P/P_{IN}$ as a function of Mach number for the 24 mm opposed wall jet actuator operated at 5 kV with the TBL tripped. Again there is significant net power savings and it occurs at the higher Mach numbers; in this case over the approximate Mach number range $0.072 < M_\infty < 0.097$ FIG. 29 presents $\Delta P/P_{IN}$ as a function of Mach number for the 16 mm unidirectional wall jet actuator operated at 5 kV with the TBL tripped. Due to the very large drag reduction shown in number range $0.072 < M_\infty < 0.097$.

Both the new unidirectional and opposed wall jet actuator designs have been found capable of smoothing near-wall low speed streaks to intervene in the STGI mechanism responsible for the self-sustaining mechanism of near-wall turbulence production. As a consequence, very significant reduction in skin friction drag has been observed. The opposed wall jet actuator has produced drag reduction of over 65% while the unidirectional spanwise wall jet actuator has realized up to 58% drag reduction. Perhaps most significant is the demonstration of significant net power savings; the power gain through drag reduction (especially at the higher Mach numbers) has been shown to significantly exceed the power input to the actuator for both actuator designs. This is a consequence, in part, of the comparatively low power required in the operation of the new actuator.

Unlike separation control applications where increased actuator authority is generally beneficial, STGI control is shown to be very sensitive to applied voltage (i.e. plasma induced wall jet velocity) with applied voltages both above and below that associated with optimum drag reduction capable of producing significant drag increases. This is likely associated with wall jet velocities that increase spanwise near-wall velocity gradients, $\partial U/\partial z$, which augments wall-normal vorticity and thereby exacerbates the STGI mechanism.

Comparison of tripped and untripped flow control cases demonstrates that drag reduction for both actuator configurations is generally optimum for a spanwise inter-electrode spacing of approximately 1000 viscous wall units or, equivalently, the control of ten low-speed streaks. For inter-electrode spacing approaching 2000 viscous wall units (20 low-speed streaks) the drag reduction is greatly reduced.

Figure 30:
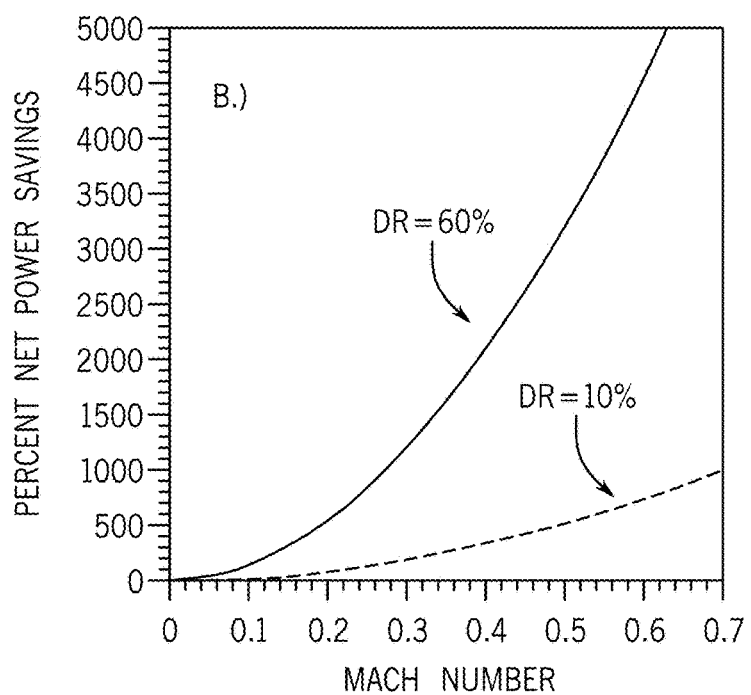
FIG. 30 is a chart showing the net power savings of the 16 mm opposed electrode configuration operating at 5 kV.

FIG. 30 presents the projected percentage net power savings as a function of $M_\infty$ for the range of fractional drag reductions representative of those achieved in the reported experiments for the 24 mm configuration. This figure shows that $\Delta P/P_{IN}$ varies approximately quadratically with increasing $M_\infty$. Note that even if $P_{IN}$ was an order of magnitude larger than estimated, the net power savings at $M_\infty=0.6$ would still be 80% and 450%, respectively, for fractional drag reductions of DR=0.1 and 0.6.

In the course of this disclosure, the constraints on the design of the body force field can be summarized in the following ways: 1) the effect of actuation should be kept within the laminar sub-layer; 2) at tunnel conditions, the total force should be 150 mN/m (based on the measurements in the Notre Dame tunnel, 3) the force should be strongest at the junction between the covered and exposed electrodes; 4) based on conventional plasma actuators, the body force should drop away very quickly over the covered electrode, and more slowly over the exposed electrode; 5) the force field should induce a normal velocity component toward the wall above the junction between the covered and exposed electrodes; 6) the force field should induce a spanwise velocity component away from the electrode junction over the exposed electrode, 7) the force field was set to act in the wall-normal direction about 30% as strongly as in the spanwise direction; 8) since the channel conditions were different than those in the tunnel, the body force is scaled by the ratio of dynamic pressures.

Using the above constraints, the following Gaussian function was developed to model the body force magnitude:

$$F = A\exp\left(-\left(\frac{(z-z_0)^2}{2*\sigma_z^2} + \frac{(y-y_0)^2}{2*\sigma_y^2}\right)\right) \quad (4)$$

In the above expression, $y_0$ and $z_0$ represent the origin of the body force function. For the current work, this was taken to be 0.001 m normal to the actuator electrode junction. Based on the mean velocity profiles in the baseline case, the value for $\sigma_y$ was chosen as:

$$\sigma_y = 0.00035 \quad (5)$$

The value used for $\sigma_z$ depended on the spanwise position of the given point relative to the location of the electrode junction. A base value was defined using the spanwise width of the domain such that the function would have non-trivial values over roughly a quarter of the spanwise extent:

$$\sigma_z = \frac{W}{4\sqrt{2\ln 10}} \quad (5)$$

If a point was in a region on the exposed electrode side of the junction, then this base value would be used as $\sigma_z$. If the point was on the covered electrode side of the junction, then $\sigma_z$ was taken to be a tenth of $\sigma_{z_0}$. The magnitude of the function was chosen such that integrating it over a meter in the streamwise direction for all the actuators on a given channel wall would yield a total body force of 150 mN (note that the actuators did not actually extend for a full meter in the simulation). The amplitude was thus taken to be:

$$\sigma_z = \frac{F_{mag}}{\pi\sigma_y\sigma_z} \quad (5)$$

The force magnitude $F_{mag}$ was computed using numerical integration of the Gaussian function over the channel cross-section and scaling the result to match the desired total actuation force of 150 mN/m on each wall. Once this magnitude was computed, the actual value used in the simulations was further scaled by the ratio of dynamic pressures between the simulation conditions and the tunnel conditions.

Figure 31:
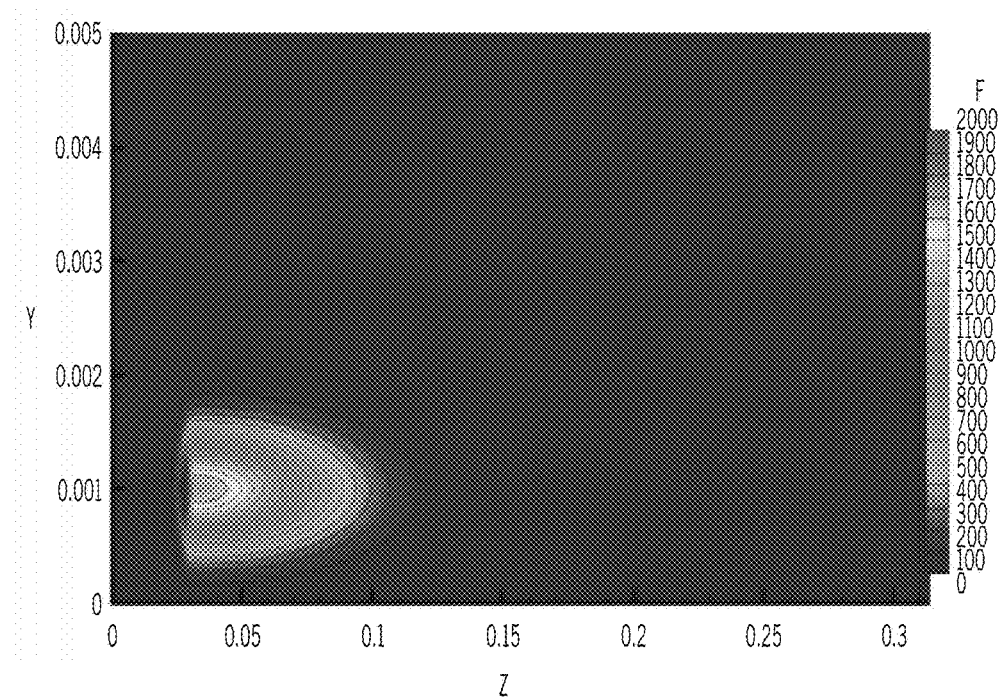
FIG. 31 is a chart showing the body force contours of a single actuator's input.

Two plasma actuators were modeled on each wall of the channel, in an opposed configuration (and mirrored top to bottom). Actuators were placed at 10% span and 60% span, with the orientation such that the induced velocity would push toward the center of the domain. The body force was active only in the upstream half of the flow domain. A plot of the body force magnitude of a single actuator is shown below in FIG. 31. As the figure shows, this body force is centered at 10 percent of span and is oriented in the direction of positive z. Thus, it is expected that flow will be drawn down from above the electrode junction and accelerated to the right of it.

Figure 32:
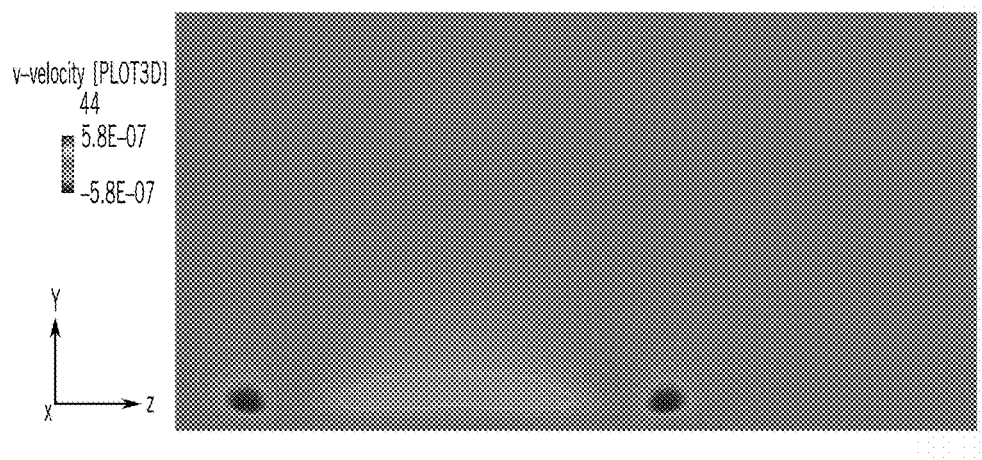
FIG. 32 is a plot showing the pattern of the wall-normal velocity induced by the plasma body forces arranged in an opposing-pair configuration after a short simulation in other quiescent.
Figure 33:
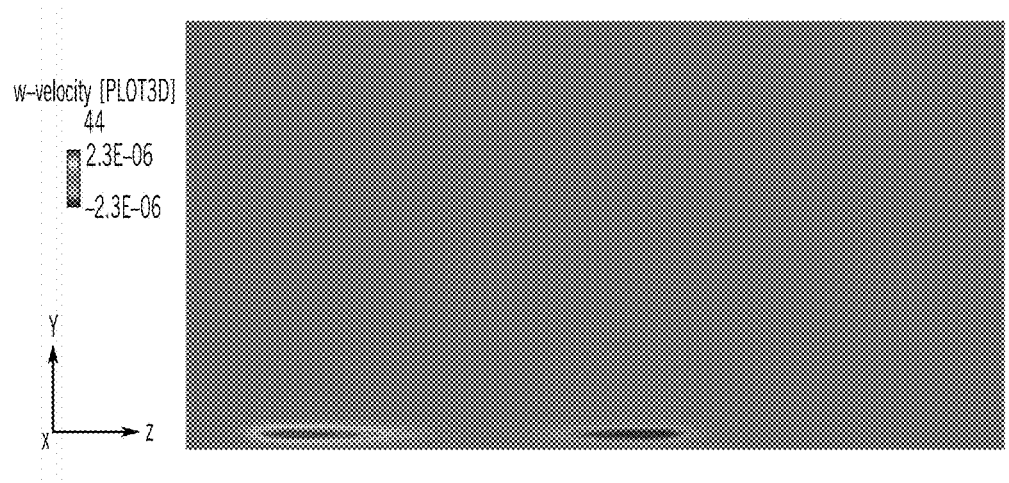
FIG. 33 is a plot showing the pattern of the spanwise velocity induced by the plasma body forces arranged in an opposing-pair configuration after a short simulation in other quiescent.

To test that the body force field was producing the expected qualitative response, a quick test case was run using a much reduced domain with quiescent flow. After a short simulation, the contours of the spanwise and wall-normal velocity components were examined. The results are plotted in FIG. 32 and FIG. 33. As the figures show, the flow is behaving exactly according to the intended design, with flow being drawn down above the two actuators (the mirroring actuators on the top wall are not visible in the plots) and ejected toward the center of the domain.

Figure 34:
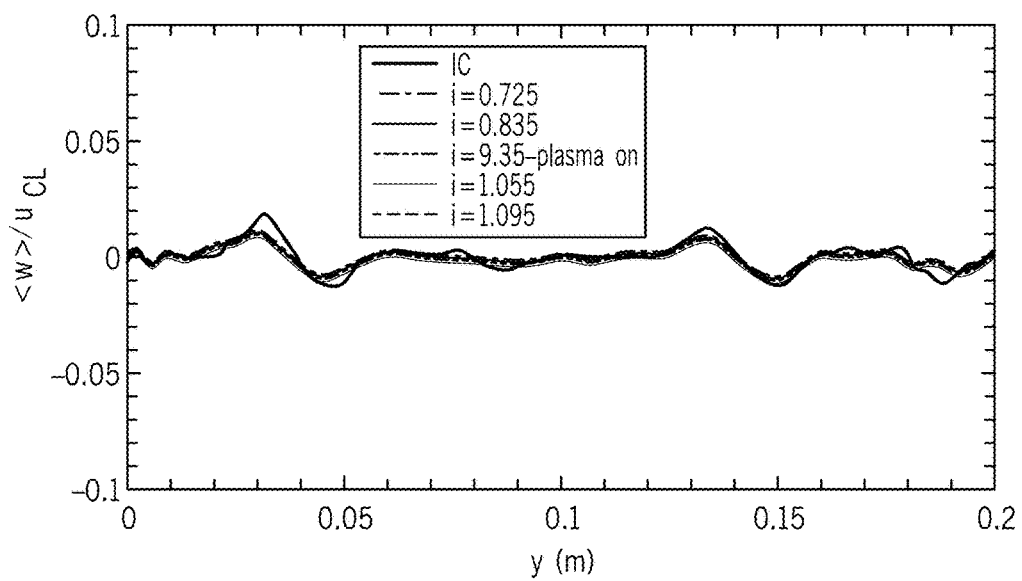
FIG. 34 is a chart of the mean spanwise velocity profiles at various times in the plasma-on turbulent channel slow simulation.
Figure 35:
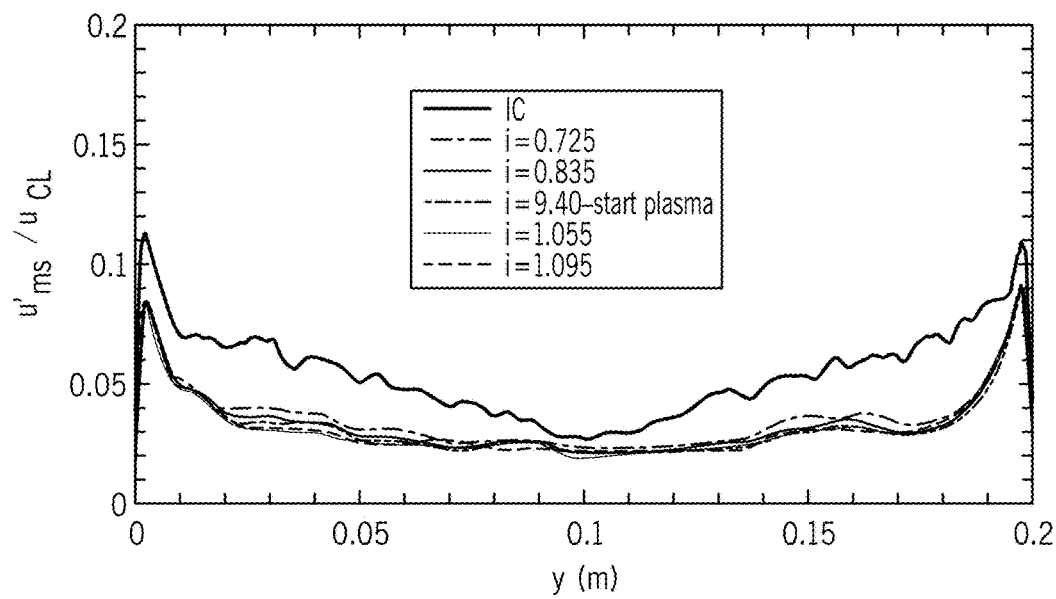
FIG. 35 is a chart profiles of the RMS of the streamwise velocity component fluctuations across the channel at various times in the plasma-on simulation.
Figure 36:
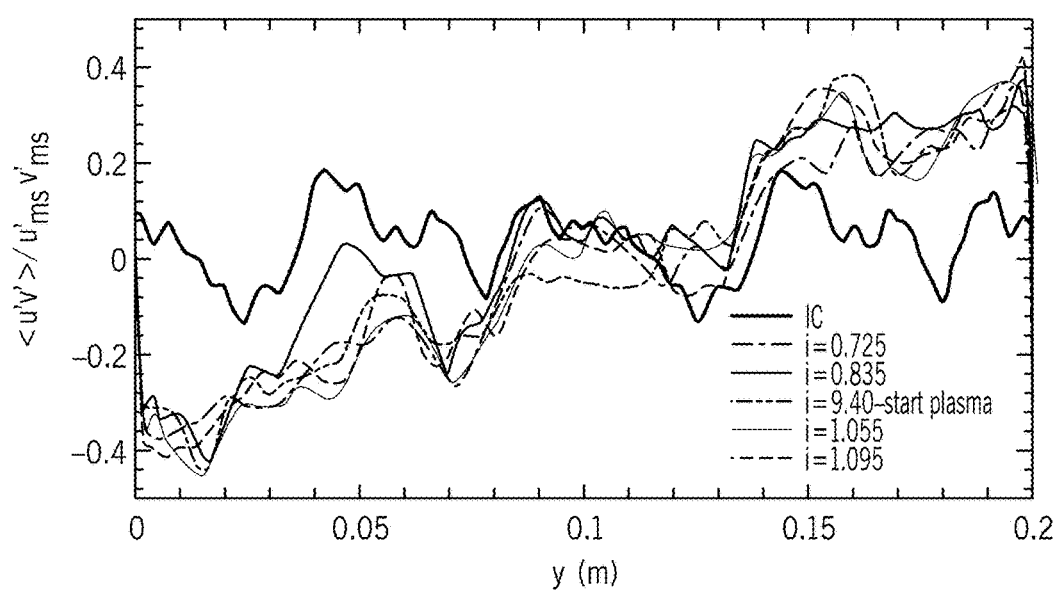
FIG. 36 is u-v fluctuation correlation profiles across the channel at various times in the baseline simulation.

The plasma body force discussed above was applied to a turbulent channel flow simulation. Even in this early stage of the simulation, however, the impact of the actuation is beginning to be seen in some quantities. FIG. 34 and FIG. 35 show profiles of the mean spanwise velocity and the streamwise turbulent velocity fluctuations across the channel. At this early point in the actuated simulation, no significant change from the baseline case is apparent. The same is true for the u-v fluctuation correlations in FIG. 36.

Figure 37:
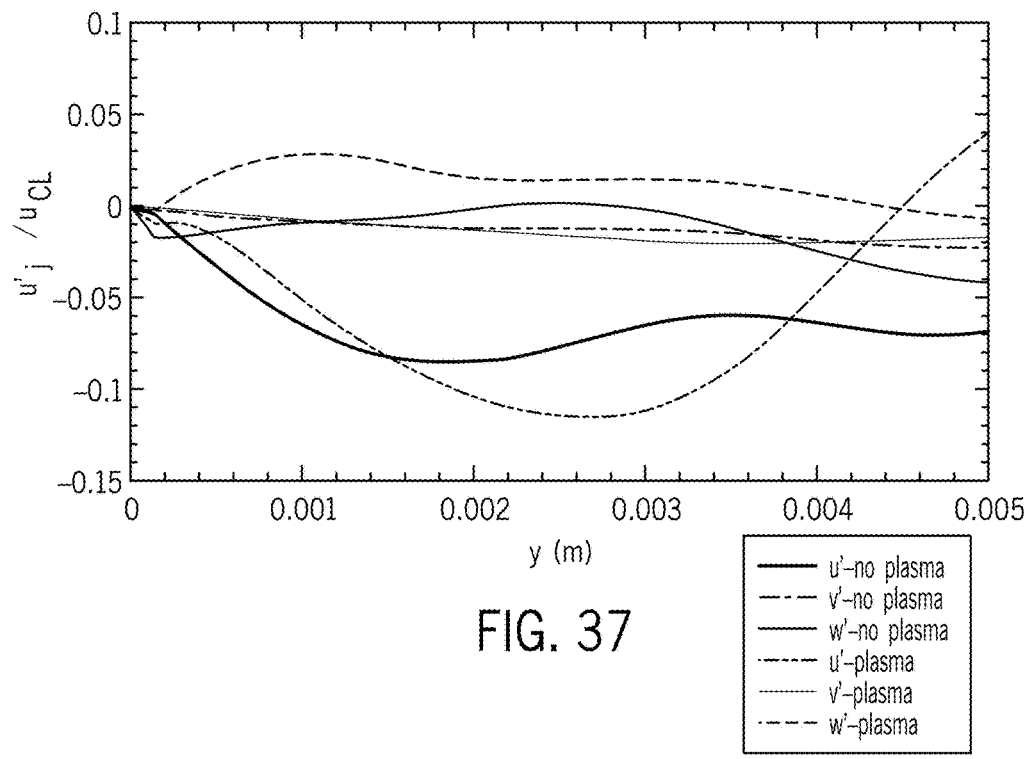
FIG. 37 is a plot of the effects of the plasma body force on velocity fluctuations in the near-wall region where the plasma is active.

Some differences become apparent when looking more closely at the actuated region. A plot of the instantaneous turbulent velocity fluctuations along a wall-normal line passing through a region where the body force is active are shown in FIG. 37. As can be seen from the scaling of the horizontal axis, this plot is tightly zoomed into the near-wall region. A distinct impact of the actuation on the spanwise and vertical velocity components is apparent, however.

Figure 38:
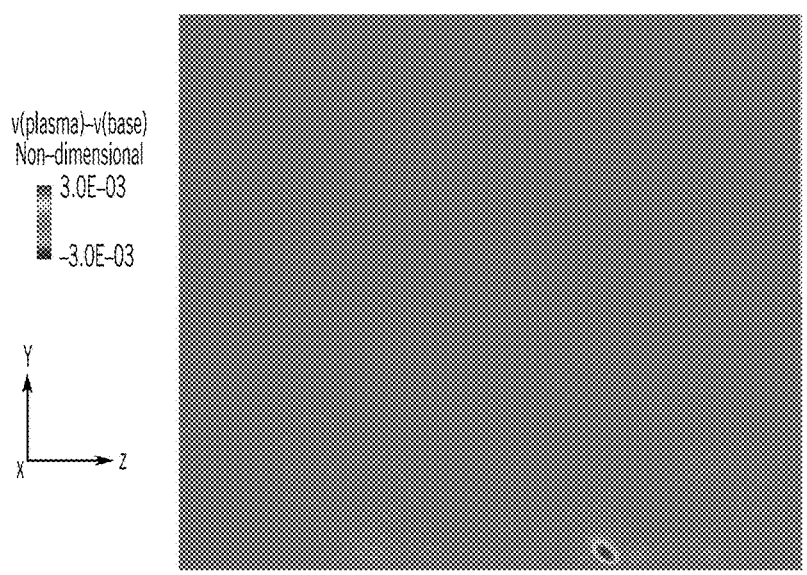
FIG. 38 is a depiction of the contours of the difference between the wall-normal velocity in the baseline case and the plasma-on case.
Figure 39:
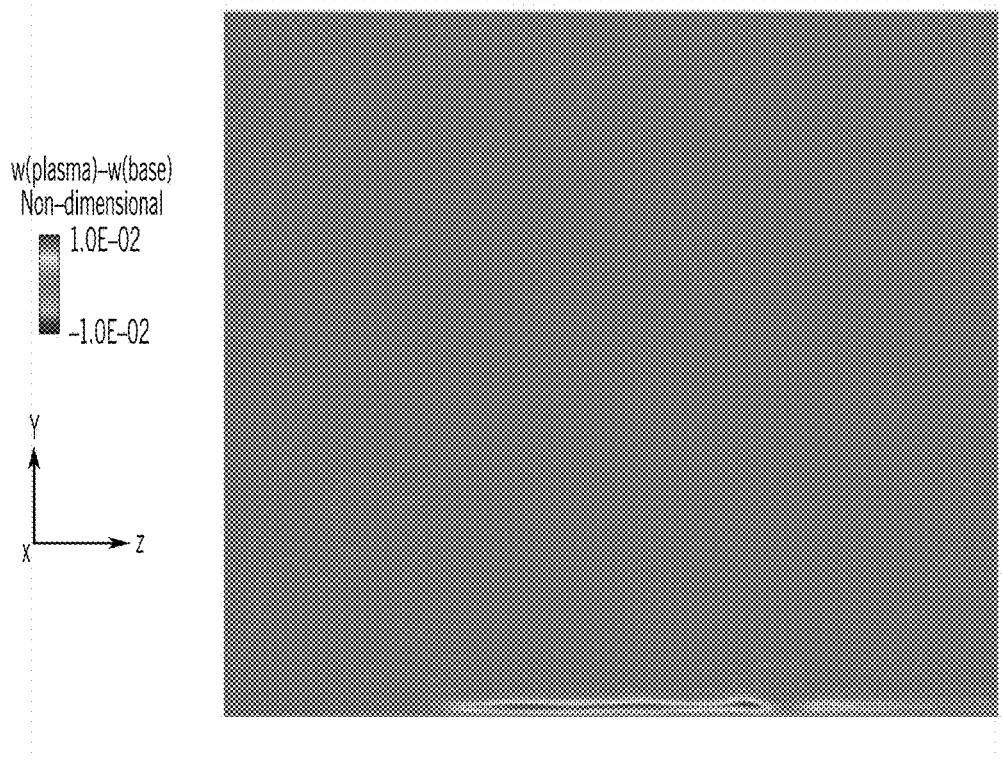
FIG. 39 is a depiction of the contours of the difference between the spanwise velocity in the baseline case and the plasma-on case.

To get a more complete picture of the impact of actuation on the flow, the components of velocity vector were compared between the baseline and actuated cases. Contours of these differences are plotted in FIG. 38 and FIG. 39. These plots are zoomed in on one of the four regions of actuation in the channel flow. As can clearly be seen, the same basic pattern of fluid being drawn down from above and ejected to the side is present. The magnitude of the differences between the solutions has been rapidly growing as the body force takes effect. The peak value of the spanwise velocity difference now approaches half of the friction velocity (the experimentally observed values are on the order of one to two times the friction velocity).

Figure 40:
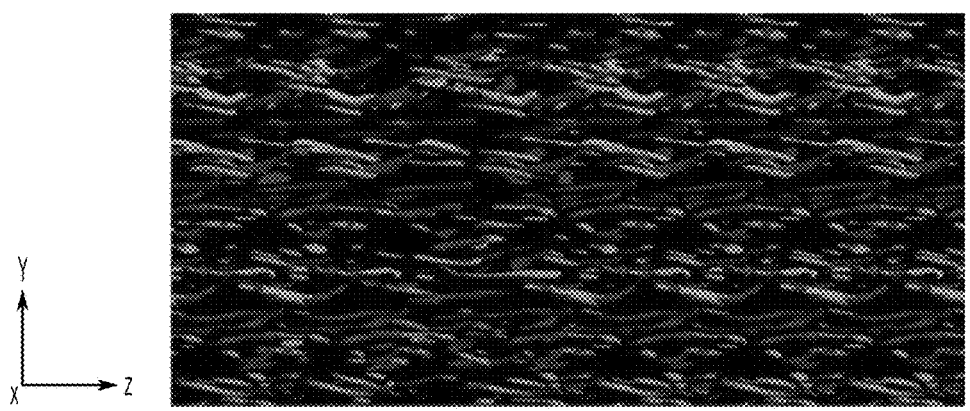
FIG. 40 is a chart of the iso-surfaces of the positive (red) and negative (cyan) streamwise velocity.

Some surfaces of stream wise vorticity are shown in FIG. 40. At this early stage of the actuated simulation, no significant disruption of the pattern seen previously in the baseline cases is seen. As the impact of the body force propagates throughout the domain differences may arise. As shown above, the disclosure has demonstrated a capability to capture important aspects of the impact of plasma actuation. While the simulations have not had time to advance far enough to assess the full effect on drag, all the necessary infrastructure has been put in place to do so.

Drag reduction was able to be achieved at all the conditions tested, and with all the actuator configurations. The maximum drag reduction of more than 65 percent observed in the turbulent flat plate boundary layer far exceeds the capabilities of any other technology. Even when accounting for the power required to drive the SLIPPS system, net drag reduction of more than 50 percent was observed in some cases.

The SLIPPS drag reduction technology clearly has the potential to have a major impact on the efficiency of a wide array of air vehicles, raising the possibility of longer ranges, heavier payloads, reduced fuel costs, and less greenhouse gas emissions.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A plasma actuator array comprising:
   a plurality of plasma actuators positioned on a surface, each plasma actuator comprising:
   a dielectric;
   a first electrode exposed to a fluid flow, the fluid flow having a boundary layer with a boundary layer mean flow direction;
   a second electrode separated from the fluid flow by the dielectric;
   a pulsed direct current power supply providing a first voltage to the first electrode and a second voltage to the second electrode; and
   a bus operably connected to distribute power to the plasma actuators, positioned to minimize flow disturbances;
   wherein the plasma actuators are arranged into a series of linear rows, each of the linear rows aligned parallel to the boundary layer mean flow direction, such that a velocity component perpendicular to the boundary layer mean flow direction is imparted to the fluid flow close to the surface, and
   wherein the exposed first electrode is adapted to produce opposing spanwise blowing with a stagnation line in the space between neighboring covered second electrodes.

2. The plasma actuator array of claim 1 wherein the plasma actuators are arranged to produce a reduction in the viscous drag of the fluid flow across the surface.

3. The plasma actuator array of claim 2 wherein the reduction in the viscous drag is accomplished by smoothing a mean flow distortion produced by turbulent boundary layer low-speed streaks to prevent streak transient growth instability that results in streak lift-up and the generation of higher viscous drag.

4. The plasma actuator array of claim 1 wherein the exposed electrode is adapted to produce uniform spanwise blowing.

5. The plasma actuator array of claim 4 wherein the exposed electrode is located on the edge of the covered electrode.

6. The plasma actuator array of claim 1 wherein each plasma actuator further comprises:
   a switch electrically coupled to the first and second electrode and to the direct current power supply such that energization of the direct current power supply by action of the switch causes the fluid to generate a plasma on the surface;
   the plasma, having an electric field vector produced by the first and second electrodes resulting in a body force vector field that induces a velocity component in the fluid in a direction parallel to the surface and perpendicular to a mean flow direction of the boundary layer fluid flow;
   wherein the energization caused by the switch creates a repetitive pulse having a length of time by momentarily connecting one of the first or second electrodes to a ground, such that, for the majority of the pulse, the voltages of the first and second electrodes are at the same DC potential and no power is consumed by the plasma actuator array.

7. The plasma actuator array of claim 1 wherein the fluid flow along the surface is an attached turbulent boundary layer.

8. The plasma actuator array of claim 1 wherein the plasma actuators are arranged to lower the viscous drag in the turbulent boundary layer that passes over the surface covered by the actuator array.

9. The plasma actuator array of claim 8 wherein the plasma actuator array is positioned on the surface in areas over which attached turbulent boundary layers exist.

10. The plasma actuator array of claim 1 wherein plasma actuators are arranged in a rectangular pattern to cover a portion of the surface over which an attached turbulent boundary layer flows.

11. The plasma actuator array of claim 10 is located at anywhere the turbulent boundary layer along the surface is fully attached.

12. The plasma actuator array of claim 1 wherein the difference between the first voltage and the second voltage is sufficient to form a plasma and to generate a body force that imparts momentum to the air.

13. A method of reducing viscous drag due to attached turbulent boundary layer fluid flow on a surface comprising
   arranging an ordered series of plasma actuators, each plasma actuator with an exposed first electrode and a covered second electrode, to cover a surface under the turbulent boundary layer fluid flow to produce opposing spanwise blowing with a stagnation line in the space between neighboring covered second electrodes;
   energizing the ordered series of plasma actuators with a pulsed direct current power flow;
   imparting a velocity component to the fluid flow that is parallel to the surface and perpendicular to a mean flow direction of the fluid flow; and
   smoothing a distortion in the fluid flow produced by low-speed streaks to prevent streak transient growth instability and lift-up of the low-speed streaks from the surface and thereby to reduce viscous drag of the fluid flow across the surface.

14. A plasma actuator array comprising:
   a plurality of plasma actuators positioned on a surface, each plasma actuator comprising:
   a dielectric;
   a first electrode exposed to a fluid flow, the fluid flow having a boundary layer with a boundary layer mean flow direction;
   a second electrode separated from the fluid flow by the dielectric;
   a pulsed direct current power supply providing a first voltage to the first electrode and a second voltage to the second electrode;
   a bus operably connected to distribute power to the plasma actuators, positioned to minimize flow disturbances; and wherein the plasma actuators are arranged into a series of linear rows, each of the linear rows aligned parallel to the boundary layer mean flow direction, such that a velocity component perpendicular to the boundary layer mean flow direction is imparted to the fluid flow close to the surface, wherein the exposed first electrode is adapted to produce opposing spanwise blowing with a stagnation line in the space between neighboring covered second electrodes.

15. The plasma actuator array of claim 14 wherein the exposed first electrode is located in the spanwise center of the covered second electrodes.

* * * * *